March 23, 1943.  G. R. PENNINGTON  2,314,554
POWER TRANSMISSION AND CONTROL MEANS THEREFOR
Filed Sept. 17, 1938  7 Sheets-Sheet 1

INVENTOR
Gordon R. Pennington.
BY
Harness, Dick, Patee & Harris
ATTORNEYS.

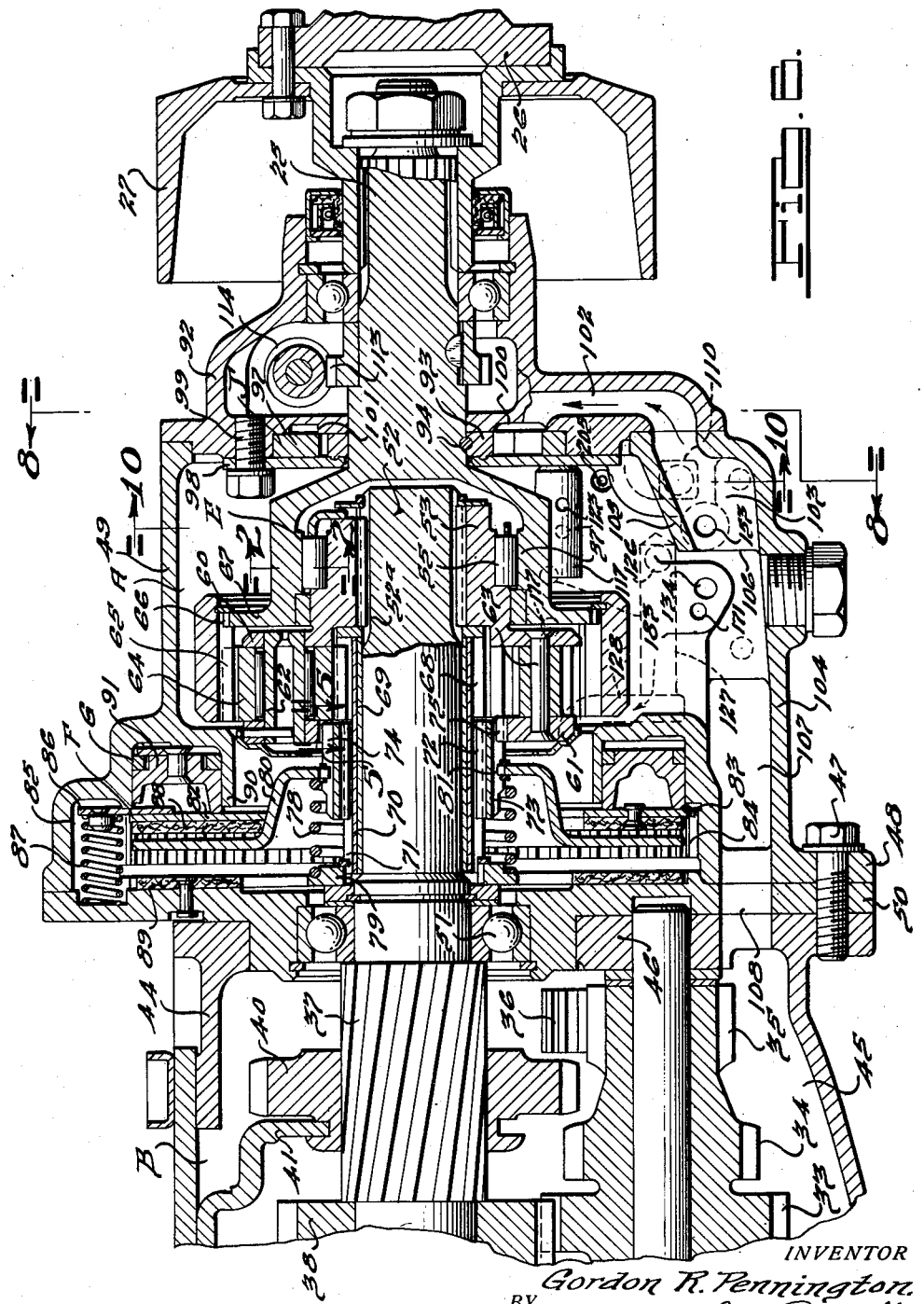

March 23, 1943. G. R. PENNINGTON 2,314,554
POWER TRANSMISSION AND CONTROL MEANS THEREFOR
Filed Sept. 17, 1938 7 Sheets-Sheet 3
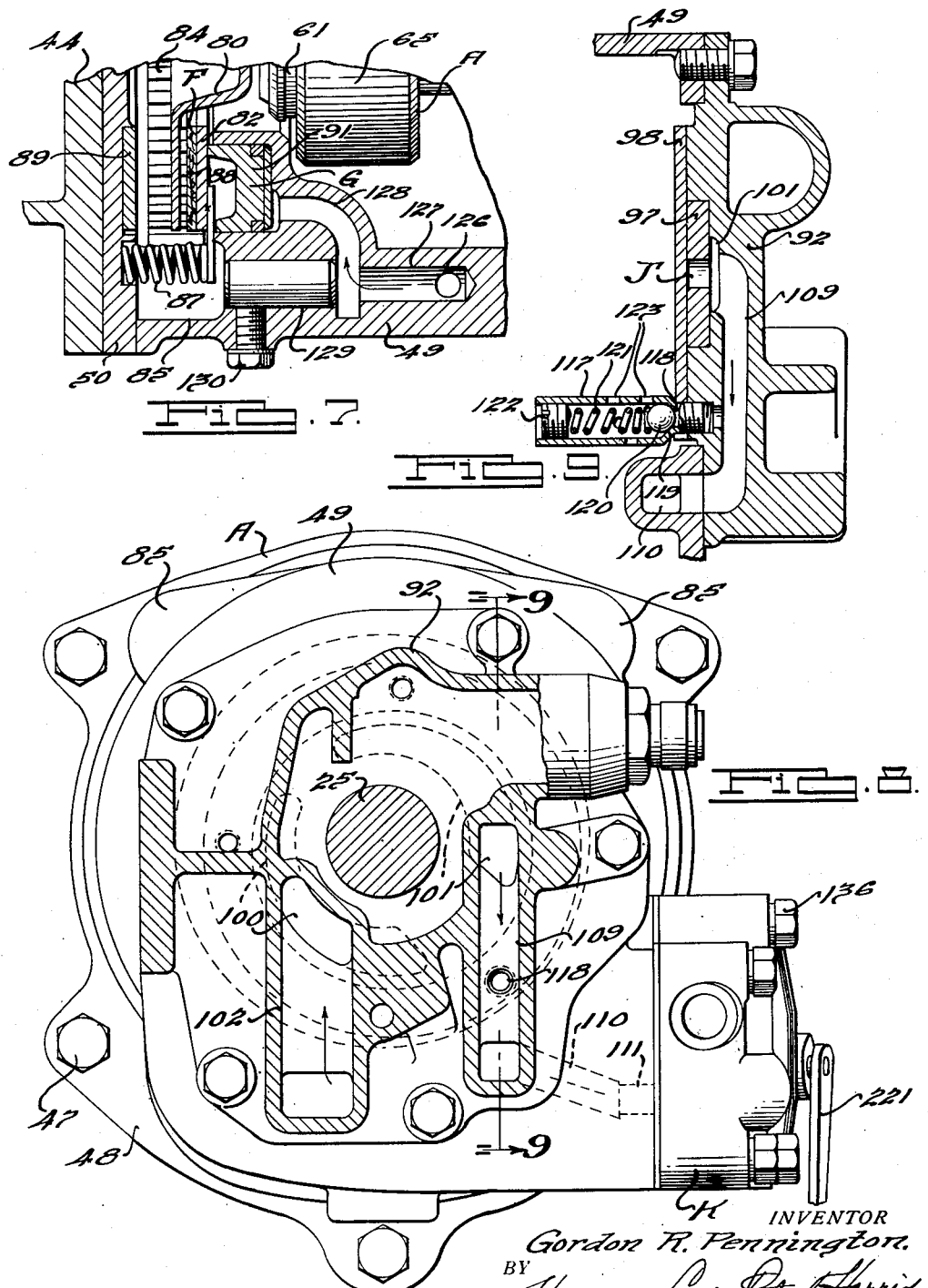
INVENTOR
Gordon R. Pennington.
BY
ATTORNEYS.

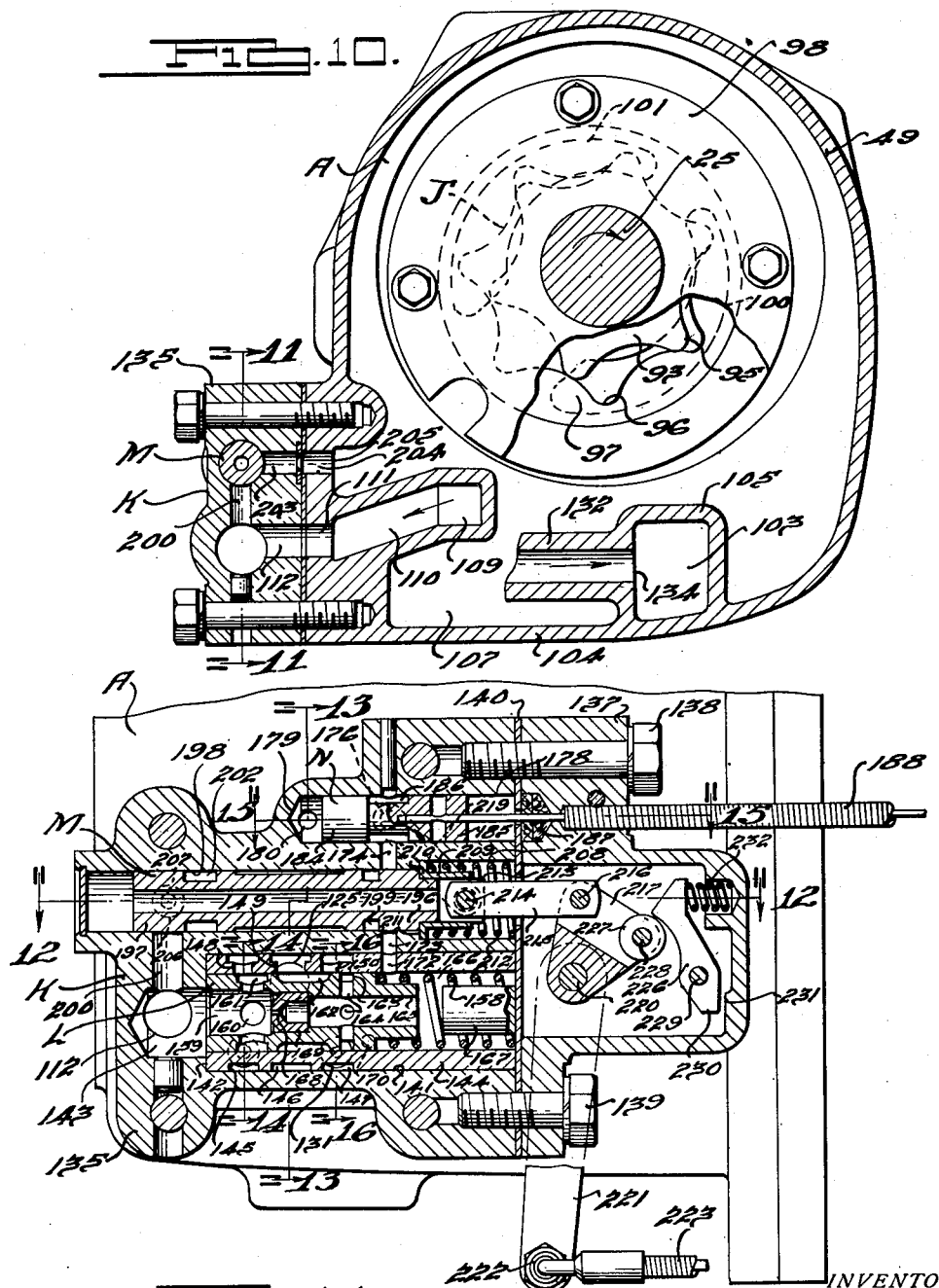

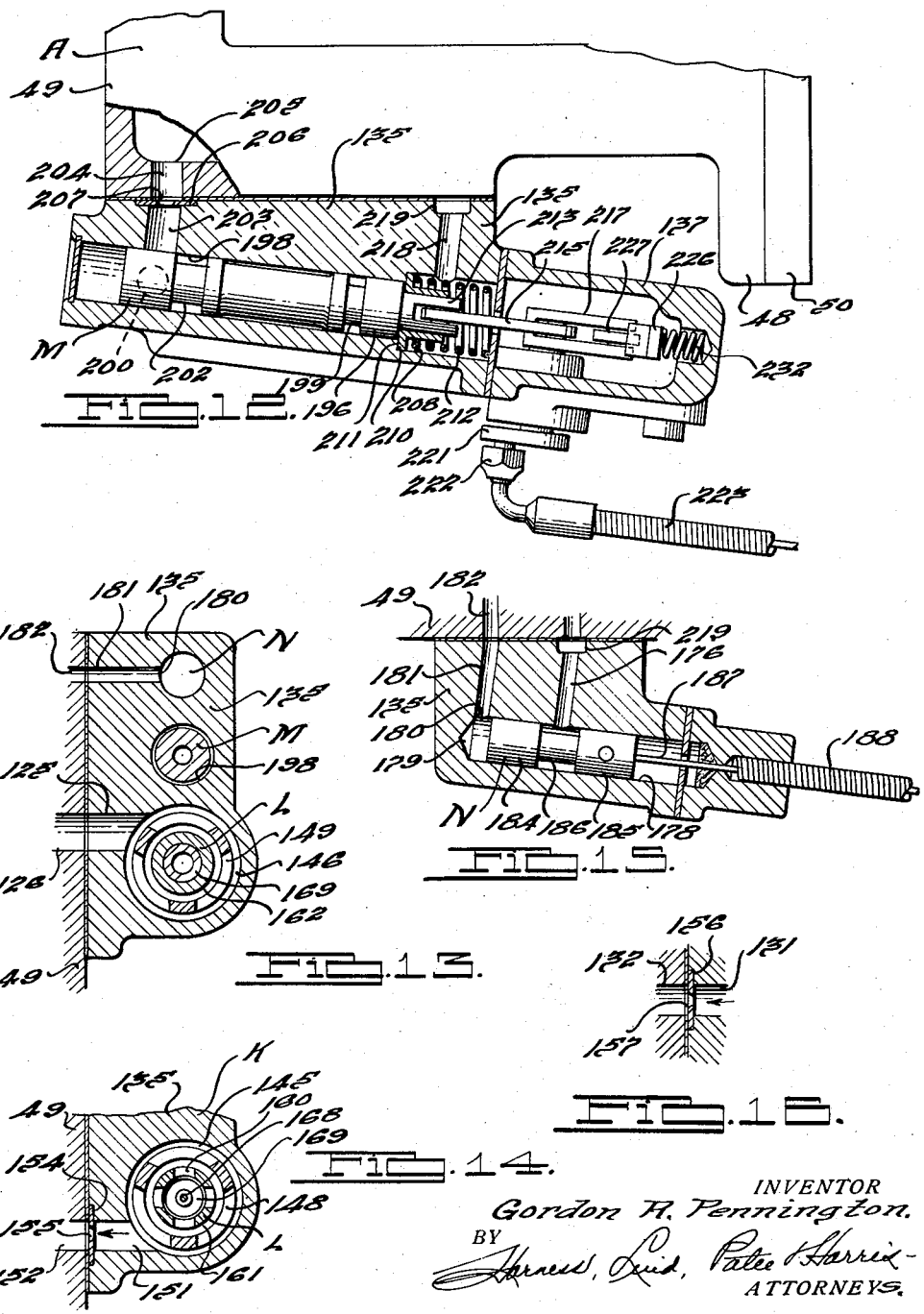

March 23, 1943.   G. R. PENNINGTON   2,314,554
POWER TRANSMISSION AND CONTROL MEANS THEREFOR
Filed Sept. 17, 1938   7 Sheets-Sheet 6

INVENTOR
Gordon R. Pennington.
BY
Harness, Dickey & Pierce Harris
ATTORNEYS.

March 23, 1943. G. R. PENNINGTON 2,314,554
POWER TRANSMISSION AND CONTROL MEANS THEREFOR
Filed Sept. 17, 1938 7 Sheets-Sheet 7
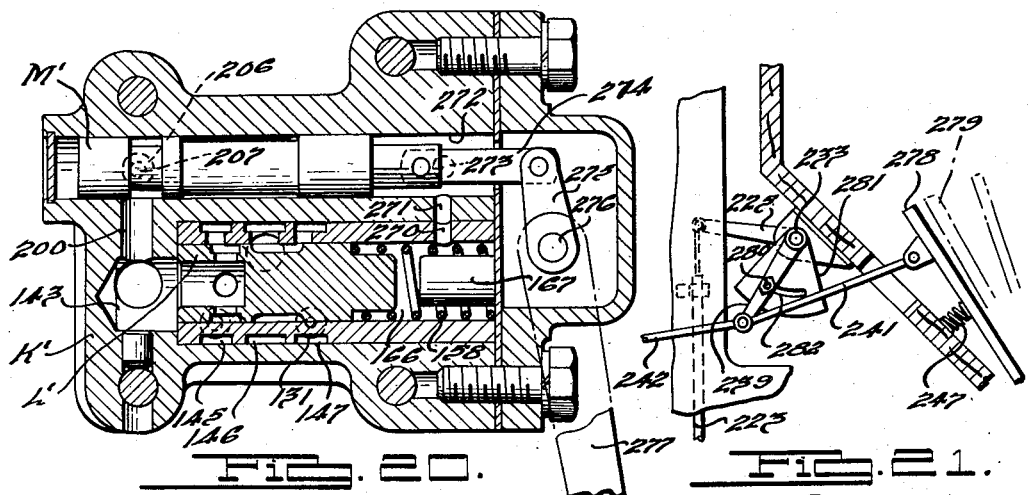
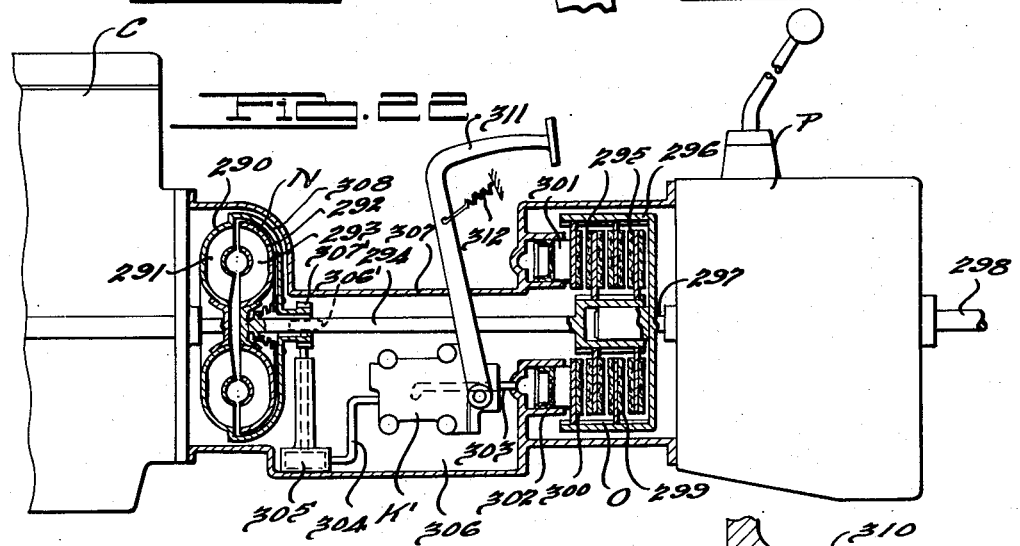
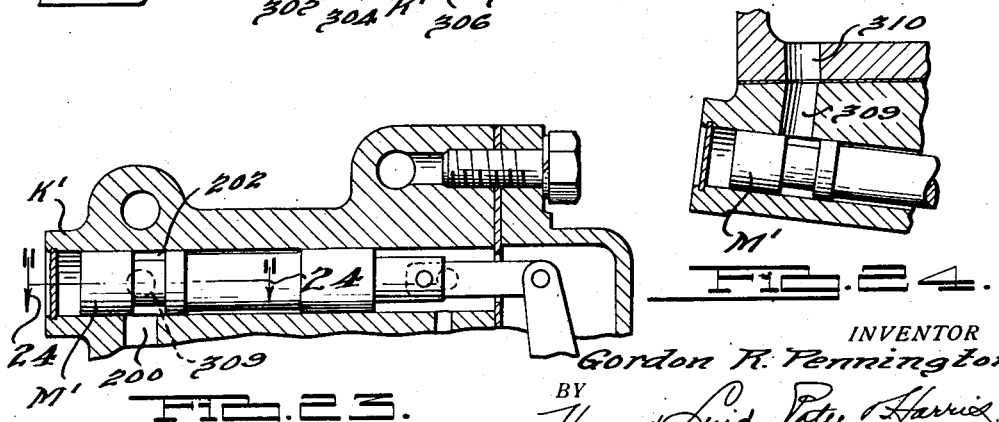
INVENTOR
Gordon R. Pennington.
BY
ATTORNEYS.

Patented Mar. 23, 1943

2,314,554

UNITED STATES PATENT OFFICE 2,314,554

POWER TRANSMISSION AND CONTROL MEANS THEREFOR

Gordon R. Pennington, Birmingham, Mich., assignor to Chrysler Corporation, Highland Park, Mich., a corporation of Delaware Application September 17, 1938, Serial No. 230,417

29 Claims. (Cl. 74—472)

This invention relates to motor vehicles and refers more particularly to improvements in control means for vehicle drives.

It is an object of my invention to provide an improved pressure fluid control capable of a variety of applications to motor vehicle and other drives.

Another object is to provide an improved pressure fluid governing system operating automatically in response to predetermined desired conditions of pressure fluid delivery for effecting control of any suitable motor vehicle fluid operated device.

My pressure fluid control system may be used in conjunction with power transmissions, for example, for effecting change in the speed ratio drive of the vehicle. An application of my control system may be made to clutches, for example, whereby to control the vehicle power transmitting drive at any convenient point or points. In any event, I preferably employ some form of pressure fluid operated device associated with the power transmission, such device being operated by my pressure fluid control means.

In carrying out my invention, according to one embodiment thereof, I provide a valve adapted to be operated in response to predetermined pressure of a suitable fluid acting on the valve for controlling the delivery of the pressure fluid to the drive control device aforesaid. By pumping the fluid proportionately with a part whose speed of movement varies with the vehicle speed, the valve is operated in accordance with vehicle speed to provide what may be termed a "hydraulic governor."

I preferably incorporate a system of orifices associated with the fluid delivered to the valve and from the drive control device so arranged that both the operation and release of the drive control device will take place at predetermined desired vehicle driving speeds. As an auxiliary feature, my invention further includes means under control of the vehicle driver for venting the fluid acting on the valve so that the valve may return to cut off pressure fluid delivery to the control device independently of the vehicle speed. By incorporating an orifice in this vent I have provided a restrictive vent control on the valve return by the driver control means such that the vent will be effective to return the valve only below a predetermined vehicle speed.

A further feature of my invention resides in the provision of the aforesaid driver control means in conjunction with the vehicle throttle adjusting mechanism which usually embodies an accelerator pedal. Where my system is associated with a valve operating to effect a step-up or a faster drive in a power transmission, I have thus provided means for returning the valve for a "kick-down" operation of the transmission by manipulation of the accelerator pedal provided that the vehicle speed is not excessive as where my restrictive vent or orifice is employed as aforesaid. Such arrangement protects the mechanism against a down-shift in the transmission under conditions which might excessively race the engine and otherwise be objectionable. I may also arrange the mechanism so that the valve cannot be moved under action of the pressure fluid until the accelerator pedal is approximately fully released, the kick-down operation preferably requiring manipulation of the accelerator pedal through its throttle opening range of travel and therebeyond.

I have also provided a further driver control means which may be used as a "dash control" to render the valve inoperative to supply pressure fluid to the control device.

In the more specific phases of my invention the fluid operated control valve is arranged so that it will momentarily dwell while travelling from a position of venting the drive control device to a second position of delivering the pressure fluid to the drive control device. As the valve starts its movement it closes the vent at the valve pressure chamber so that its movement once started is accelerated by a rise in the pressure of the fluid acting on the valve. At the dwell point the valve delivers fluid to the drive control device to effect initial engagement thereof while restrictively venting this device to effect a smooth or soft engagement of the control device. Then the pressure of the fluid rapidly builds up and the valve completes its movement to the aforesaid second position to fully engage the control device which is preferably frictionally engaged. Even when the control device is fully engaged it is preferably restrictively vented to enable control of its release in accordance with conditions of pressure of the fluid supplied thereto.

In a modified embodiment of my invention, I have applied my fluid system to a drive control device in the form of a clutch operating between a fluid coupling and any suitable type of speed ratio transmission.

In power transmission systems embodying a fluid coupling, difficulty has been experienced in that when the engine idles, the inherent drive or drag effect in the fluid coupling causes the vehicle to creep and is otherwise objectionable in preventing smooth changes in the transmission mechanism. My invention provides fluid pressure means preferably operating in response to predetermined speed of the engine or input shaft for automatically controlling the drive connection between the fluid coupling and the transmission, the arrangement being such that the fluid coupling is automatically disconnected from the transmission when the engine idles and is automatically connected when the engine speeds up above its idling speed. I have also provided means under control of the operator for disconnecting the fluid coupling at any time irrespective of the engine speed.

The foregoing general examples of applications of my invention will serve to illustrate the operating functions of my pressure fluid control system which may be employed to advantage wherever it is desired to control operation of a fluid operated device under predetermined pressure fluid delivery conditions usually at a predetermined speed of the vehicle or engine.

Where restricted or metered fluid flow is used, I preferably employ an orifice presenting a sharp edge to the fluid flow in order to minimize the effect of temperature changes on the fluid medium. In general, any fluid conduit offers two classes of resistance to fluid flow therethrough, viz., one being a function of the fluid viscosity and the other having to do with the kinetic effects of the fluid.

The kinetic effects vary as the density of the liquid is changed and this is a negligible factor within the temperature range ordinarily dealt with in automotive practice. The viscosity, on the other hand, varies greatly with the temperature changes within this range and with liquids customarily used in pressure fluid systems for vehicle drive controls in general.

The sharp edge orifice has a minimum of length and surface over which the oil or other fluid is in shear and therefore the viscosity may vary without material variation in the flow through the orifice. This allows a wide selection of fluids without corresponding variation in the operating functions of the system and is important in insuring continued functioning of the system under very nearly the same conditions of vehicle or engine speed regardless of temperature variation of the fluid medium.

Further objects and features of my invention will be more apparent as this specification progresses, reference being had to the accompanying drawings in which:

Fig. 5 is an enlarged sectional plan view illustrating the development of a portion of the clutch teeth as seen at the section line 5—5 of Fig. 6.

Fig. 6 is a sectional elevational view through the overdrive mechanism and a portion of the main speed ratio changing transmission.

Fig. 7 is a detail sectional view illustrating the pressure fluid inlet to the motor for actuating the sun gear brake.

Fig. 8 is a sectional elevational view looking forwardly as indicated by line 8—8 of Fig. 6.

Fig. 9 is a detail sectional elevational view taken as indicated by the line 9—9 of Fig. 8.

Fig. 10 is a sectional elevational view taken as indicated by line 10—10 of Fig. 6 with parts of the pump casing broken away.

Fig. 11 is a sectional elevational view taken as indicated by line 11—11 of Fig. 10 illustrating my pressure fluid control with the valving thereof in the position corresponding to normal direct drive for the particular transmission illustrated in Figs. 1 to 10 in association therewith.

Fig. 12 is a sectional plan view taken as indicated by line 12—12 of Fig. 11 illustrating the kick-down valve in its Fig. 11 position.

Fig. 13 is a sectional elevational view taken as indicated by line 13—13 of Fig. 11.

Fig. 14 is a sectional elevational view taken as indicated by line 14—14 of Fig. 11.

Fig. 15 is a sectional plan view taken as indicated by line 15—15 of Fig. 11 illustrating the dash control valve in its Fig. 11 position.

Fig. 16 is a sectional elevational view taken as indicated by line 16—16 of Fig. 11.

Fig. 20 is a view generally similar to Fig. 11 illustrating a modified form of my invention.

Fig. 21 is a view generally similar to Fig. 3 but illustrating a modified arrangement of accelerator pedal kick-down control.

Fig. 22 is a side elevational view of a further power transmission system differing from the Fig. 1 system and utilizing the Fig. 20 form of my pressure fluid control with slight modification, parts of the operating mechanism being shown in sectional elevation.

Fig. 23 is a fragmentary sectional elevational view of the driver controlled valve employed with the Fig. 22 system.

Fig. 24 is a detail sectional plan view taken as indicated by line 24—24 of Fig. 23.

Figure 1:
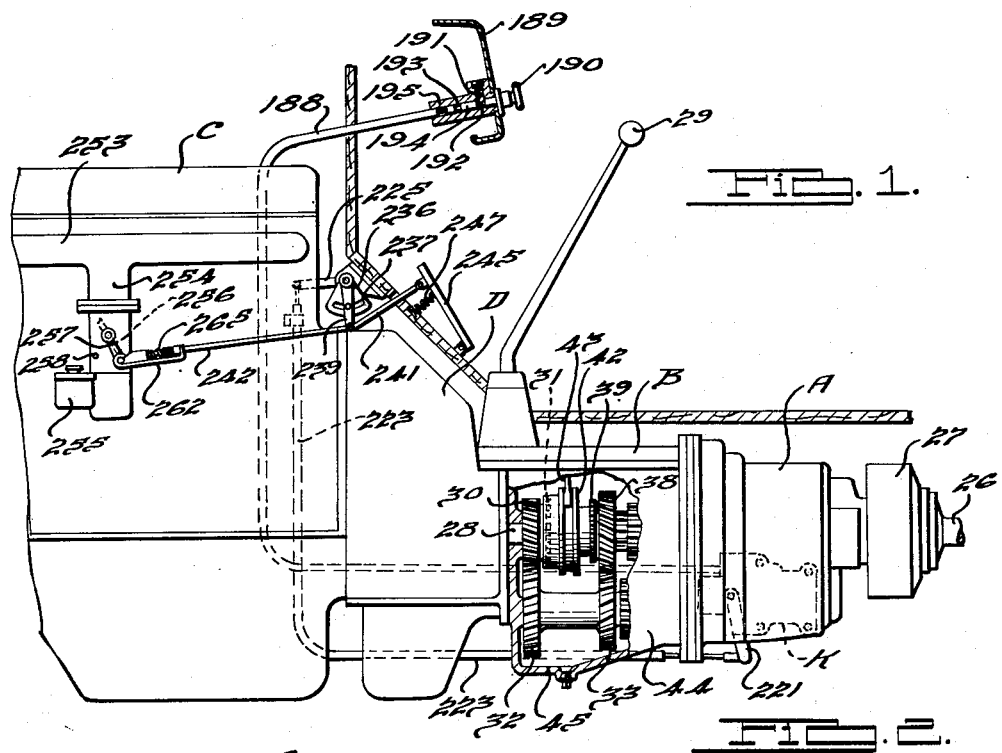
Fig. 1 is a side elevational view, somewhat diagrammatic in form, illustrating my invention applied to a motor vehicle overdrive transmission, a portion of the casing of the main speed ratio transmission being broken away to illustrate the gearing.

Referring to the drawings, I have illustrated my invention in conjunction with a change speed transmission and more particularly in Figs. 1 to 21 in conjunction with an overdrive mechanism of the general type disclosed and claimed in the copending application of Neracher et al., Serial No. 222,006 filed July 29, 1938. However, I desire to point out that my invention may be used with a variety of drive control systems affording overdrive or other speed ratio of drive as may be desired including a direct or one-to-one ratio. Furthermore by employing multiples of my pressure fluid control any number of step-up or step-down speed ratios may be controlled as will presently be more apparent from the following illustrative description of the principles of my invention.

As an example of using my invention, I have illustrated the overdriving mechanism A interposed between a speed ratio changing main transmission B and a driven shaft 25, and its extension 26, the latter extending rearwardly to drive the rear wheels (not shown) of the motor car or vehicle in the usual well known manner, it being understood that I have elected to show my invention in association with a motor vehicle drive although in its broader aspects, it is not necessarily limited thereto. The customary propeller shaft brake drum 27 is illustrated between shafts 26 and 28 as comprising a part of the drive from the overdriving mechanism A to the vehicle.

The illustrated driving mechanism may be used to advantage at various other points in the line of general power transmission between the vehicle engine C and the driven wheels, or between driving and driven means such as shafts of other types of devices. In accordance with customary practice, the drive from engine C to the main transmission B is controlled by a clutch D of any suitable type, this clutch transmitting the drive to the main transmission by a shaft 28.

The transmission B may be of any suitable type, such as the conventional selector type operated in the well known manner by manipulation of the gear shift lever 29 and the usual selector controls, whereby the various adjustments may be made to the transmission in order to provide forwardly driving speed ratios and a reverse drive through the transmission.

Inasmuch as the type of transmission illustrated at B is well known in the art, I have shown only a portion of the operating mechanism in Figs. 1 and 6. Shaft 28 carries the countershaft driving pinion 30 and also the direct drive clutch teeth 31, pinion 30 meshing with the driving gear 32 of the countershaft clutch gearing which further includes a second speed drive gear 33, a low speed drive gear 34, and a gear 35 in constant mesh with a reverse idler gear 36. Loosely mounted on the transmission power take-off shaft 37 for rotation relative to this shaft, is the usual second speed gear 38 in constant mesh with the countershaft gear 33, a set of second speed clutch teeth 39 being driven with gear 38.

Splined on the shaft 37 for shifting movement along this shaft is the low and reverse gear 40 shiftable by a fork 41 under control of the gear shift lever 29. When the gear 40 is shifted forwardly into mesh with countershaft gear 34, shaft 37 will be driven from shaft 28 in a forward low speed ratio drive through the gear train 30, 32, 34 and 40. When the gear 40 is shifted rearwardly to mesh with the reverse idler gear 36, shaft 27 will be driven backwards or in reverse relative to the forward direction of rotation of the shaft 28 through the gear train 30, 32, 35, 36 and 40.

In order to selectively drive shaft 37 in the second or intermediate speed ratio, and also in a direct drive, the usual shiftable clutch 42 is provided operable by the fork 43 under control of the gear shift lever 29, this clutch 42 being drivingly connected to the shaft 37 and adapted for selective forward and rearward shifting movements respectively to clutch with the direct drive clutch teeth 31 or the second speed drive clutch teeth 39. During the direct drive, with the parts as shown in Fig. 1, shaft 28 drives the shaft 37 by reason of engagement of clutch teeth 31 with the corresponding teeth of the shiftable clutch 42. During the second speed drive the shaft 37 is driven at a reduction speed ratio greater than that provided by the low speed ratio drive, by reason of the gear train 30, 32, 33, 38, clutch teeth 39 and shiftable clutch member 42.

The main transmission B has the aforesaid gearing disposed within a casing 44 which provides a reservoir or sump 45 for storing a suitable lubricating oil which is preferably circulated, as will be presently more apparent, between the transmission B and the overdriving mechanism A and this lubricating oil is preferably used as the fluid medium for effecting operation of the secondary controlling means for the overdriving mechanism. The transmission casing 44 is formed with a rear annular wall 46 secured by fasteners 47 to the forward wall or flange 48 of the casing 49 for containing the overdriving mechanism A. Secured between walls 46 and 48 there is located an intermediate member 50.

The transmission shaft 37 is the driving shaft for the overdrive mechanism A and is journalled in a bearing 51 carried by the intermediate member 50, the shaft 37 having a rearward driving extension 52 which projects into the overdrive casing 49 and which is formed with splines 52ª.

Figures 2, 3:
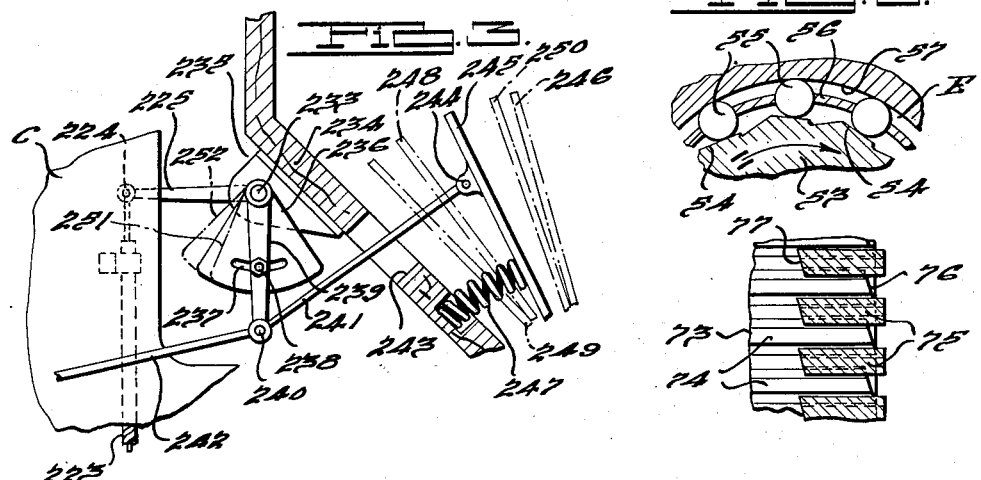
Fig. 2 is a detail fragmentary sectional elevational view taken as indicated by the line 2—2 of Fig. 6 illustrating the overrunning clutch which forms a direct drive releasable connection between the driving and driven shafts of the overdrive mechanism.
Fig. 3 is a detail enlarged side elevational view of a portion of the engine throttle valve adjusting and kick-down mechanism illustrated in Fig. 1.

Engaging splines 52ª at the rear end of driving shaft extension 52, is the inner member 53 of an overrunning clutch E which provides a releasable forward direct driving means from shaft 37 to the driven shaft 25. The overrunning clutch functions only at such times when the two-way direct drive means does not operate for any reason, as will presently be apparent. Normally, this overrunning clutch E plays a very minor part in the mechanism. As best shown in Figs. 2 and 6, the inner member 53 is formed with the usual cam faces 54 engaged by clutching rollers 55, the rollers being spaced by the usual cage 56. The outer member of the overrunning clutch E comprises a cylinder 57 formed as an enlarged forward projection of the driven shaft 25. When the driving shaft 37 has a forward direction of rotation imparted thereto (clockwise looking front to rear) and with the overdriving mechanism inoperative, the rollers 55 will be wedged between the inner and outer members 53 and 57 respectively of the overrunning clutch E so that the driven shaft 25 will be driven in a forward direction with the driving shaft 37. However, in the event that the driving shaft tends to slow down relative to the driven shaft, or in the event that the driven shaft tends to rotate forwardly faster than the driving shaft, the rollers 55 will be released from wedging action and such tendencies of the shafts to rotate relatively to one another will be readily accommodated.

The mechanism A is arranged to provide a plurality of speed ratio drives between driving shaft 37 and driven shaft 25 by providing a relatively slow speed drive which is a direct or 1 to 1 ratio drive and a relatively fast drive which provides an overdrive whereby the driven shaft is rotated faster than the speed of the driving shaft. Planetary gearing is preferred because of the recognized advantages of quietness of operation, simplicity, etc., although if desired, other forms of gearing may be employed.

The planetary gearing comprises an input planet pinion carrier structure 60 adapted to be driven directed from driving shaft 37, this carrier structure being conveniently formed as an extension of the overrunning clutch cam member 53. The carrier structure is provided with a forward carrier portion 61 connected to the portion 60 by a plurality of axle shafts 62 and spacing assemblies 63, one of these axles and spacing assemblies being illustrated in Fig. 6.

Rotatably journalled on each axle 62 is a planet pinion 64 meshing with an internal gear 65 drivingly secured at the splines 66 with a flanged extension 67 of the aforesaid driven shaft forward extension 57 of the overrunning clutch E. The planet pinions 64 also mesh with a hollow sun gear 68 having an internal lining of bearing material 69 whereby the sun gear is loosely journalled on the driving shaft extension 52 forwardly of the spines 52ª. The sun gear has a forwardly extending controlling hub 70 formed with axially extending splines 71 slidably engaging the internal splines 72 of a shiftable drive controlling sleeve 73 formed with external clutch teeth 74 adapted to clutchingly engage corresponding internal teeth 75 (Fig. 5) carried by the carrier member 61.

When the sleeve 73 moves rearwardly to clutch with the carrier portion 61, the teeth 74 and 75 are so constructed that they may relatively overrun without danger of injuring the teeth which are constructed so that they will engage only when the mating clutch teeth are rotated synchronously. Thus the end faces of teeth 74 are inclined at 76 and the forward ends of teeth 75 are correspondingly inclined at 77. This inclination is preferably in the neighborhood of five degrees, although for purposes of illustration, the inclination has been exaggerated in Fig. 5 and the inclination may be in the form of a thread-like spiral in order to insure full surface contact at the ends of the teeth or the end faces may be substantially flat. The direction of inclination is such as to permit the carrier and teeth 75 to rotate forwardly at a speed faster than forward rotation of the sun gear 68 and sleeve 73 carried therewith, the teeth 75 camming over the teeth 74.

In order to provide means for yieldingly urging rearward movement of sleeve 73 to effect clutching thereof with the carrier 61, yielding means is provided in the form of a spring 78 acting between an abutment 79 and a disc 80, the inner portion of which is fixed to sleeve 73 by a splined engagement at 81 therewith. This disc 80 provides a braking element for arresting rotation of sun gear 68 when the sleeve 73 is moved forwardly to disengage clutch teeth 74 and 75 in order to effect the overdrive between driving shaft 37 and driven shaft 25. In conjunction with my invention I provide means preferably operated by pressure fluid for shifting the disc 80 and sleeve 73 forwardly in opposition to spring 78, the arrangement being such that this shifting action of the sleeve will take place even during a full torque application of the engine C in driving the driven shaft 25 directly from shaft 37 without requiring reduction in the torque of the engine as has heretofore been common in connection with transmissions employing overdrive gearing. By employing pressure fluid controlled in a novel manner presently described I obtain the desired relatively high pressure required to shift the sleeve 73 forwardly under the aforesaid conditions and also to hold the sun gear 68 against rotation while taking the drive reaction of the overdrive.

The pressure fluid operated means comprises a braking device, generally designated at F, adapted to be actuated to brake the disc 80 by pressure fluid motor, designated as G. The braking device F comprises a pressure plate 82 externally splined at 83 to engage the internal splines 84 formed on the casing 49, the splines being interrupted at the outwardly extending casing pockets 85 one of which is shown in Fig. 6 and into each of which projects the finger 86 which is welded to the pressure plate 82.

A coil spring 87 acts in each pocket 85 between the intermediate member 50 and a finger 86 to yieldingly urge the pressure plate 82 rearwardly in its released position, this pressure plate carrying on its forward face a ring of friction braking material 88 engageable with the rear face of the disc 80. The forward face of this disc was adapted to engage the braking material 89 fixed to the intermediate member 50.

The motor G comprises an annular cylinder 90 formed as a part of the casing structure 49 and opening forwardly to slidably receive the annular piston assembly 91 which engages the pressure plate 82 and is adapted to be urged forwardly by pressure fluid. Thus when pressure fluid is introduced to cylinder 90 at the rear of piston 91, as will presently be apparent, this piston is moved forwardly in cylinder 90, causing the pressure plate 82 to slide forwardly in the splines 84 into engagement with disc 80, this disc and the sleeve 73 then moving forwardly as a unit to disengage clutch teeth 74 from the carrier teeth 75 and to bring the disc 80 into braking engagement with the friction material 89 against the action of the springs 87 and 78 thereby securely holding the sun gear 68 against rotation as long as the fluid under the required pressure is being admitted to the cylinder 90.

When the pressure of the fluid in cylinder 90 is relieved or when the pressure drops below that required to maintain brake F in operation, the springs 78 and 87 will operate to return the parts to their illustrated positions in Fig. 6, the spring 87 acting to separate the friction material 88 from the disc 80 while the spring 78 yieldingly urges clutching engagement of teeth 74 with teeth 75.

In the operation of the mechanism as thus far described and assuming a forward rotation of driving shaft 37 and with the parts positioned as in Fig. 6, a direct drive will take place to drive shaft 25 because sleeve 73 is operating to clutch the sun gear 68 with carrier 61 thereby locking the planetary gear train and causing the same to revolve as a unit with the driving and driven shafts, thus providing a two-way direct drive.

Assuming that while the direct drive is taking place by the application of torque from the engine, pressure fluid is introduced to cylinder 90. This will cause operation of motor G as aforesaid to shift sleeve 73 forwardly thereby disengaging clutch teeth 74 and 75 for releasing the sun gear 68 from the carrier 61, the sun gear then being arrested against rotation by operation of the braking device F which will produce the overdrive. At such time the planet pinions 64 will be driven forwardly around the fixed sun gear 68 thereby causing the driven shaft 25 to rotate forwardly faster than the speed of the driving shaft, clutch E overrunning.

Whenever the pressure fluid drops in cylinder 90 below the critical pressure required to operate braking device F, this braking device will be released and a step-down will take place in mechanism A by changing the drive therethrough from the overdrive to a direct drive. This change in speed ratio drive is also adapted to take place even in times when the engine is delivering its maximum torque and assuming that the cylinder 90 is vented under such conditions, it will be apparent that braking device F will be released, spring 78 moving sleeve 73 rearwardly. When the braking device F releases, the sun gear 68 and sleeve 73 which were previously held against rotation now quickly accelerate forwardly at the time that sleeve 73 is shifted rearwardly. It will frequently occur that the sleeve 73 will be accelerated to a speed equal to that of carrier 61 so that the sleeve will clutch with the carrier to provide the direct drive under the aforesaid assumed conditions. However, should the teeth 74 not clutch with the teeth 75, the sleeve 73 cannot rotate forwardly faster than carrier 61 because overrunning clutch E will immediately come into operation to establish the direct drive from driving shaft 37 to driven shaft 25.

When the overrunning clutch thus operates, the faces 76 of teeth 74 will be engaged with the faces 77 of teeth 75 and the next time that the driver partially releases the usual accelerator pedal to allow the driven shaft to overrun the driving shaft, spring 78 has sufficient strength that it will then act to force the teeth 74 into clutching engagement with teeth 75 as soon as teeth 74 slide off the faces 77 of teeth 75. During this overrunning action the sun gear and sleeve 73 will slow down at a faster rate than the carrier 61 so that the relative change in speeds of teeth 74 and 75 is not abrupt but is sufficiently gradual to permit clutching engagement of these teeth under these conditions.

Experience has been that it is impossible, with the parts properly proportioned, to cause the teeth 74 to ratchet over the teeth 75 during this overrunning action because clutching of these teeth will immediately take place. However, if for any reason such overrunning action of the teeth took place, clutching engagement of these teeth would obviously take place the next time that the engine is accelerated to drive the car because the inclined faces 77 would then guide the faces 76 of teeth 74 into clutching engagement with the teeth 75, as will be readily understood.

In driving the vehicle in reverse by the aforesaid manipulation of shift lever 29 to engage gear 40 with the reverse idler gear 36, the mechanism operates so that it does not require any lockout means for the overrunning clutch E. Before driving in reverse the vehicle is obviously first brought to a standstill and as I preferably supply pressure fluid to cylinder 90 from a pumping means driven from the driven shaft 25, or otherwise at a speed proportionate with the vehicle speed, it will be apparent that when the vehicle pump is at rest, the pump will not operate and the pressure fluid will drop at cylinder 90, thereby releasing braking means F to allow the sleeve 73 to move rearwardly and clutch with the carrier 61 to enable the reverse drive from shaft 37 to driven shaft 25. If the teeth 74 should not clutch with the teeth 75 but merely engage the faces 77, then as soon as the driving shaft 37 starts to rotate backwards for the reverse drive, the sun gear 68 and sleeve 73 will rotate backwards faster than backward rotation of carrier 61 and the spring 78 will immediately cause the teeth 74 to clutch with the teeth 75 just as soon as teeth 74 slide off the faces 77.

I will now describe the pressure fluid pumping means for supplying pressure fluid to the motor G, this means being preferably so arranged that when the vehicle is accelerated in the direct drive up to a predetermined desired speed, the pump will build up sufficient pressure to enable operation of motor G to effect the change in mechanism A from the direct drive to the overdrive. Likewise when the speed of travel of the motor vehicle drops below a predetermined desired critical speed, then the pressure of the fluid at motor G will drop causing the overdrive to be released automatically and the direct drive to immediately take place as the engine speeds up, either by engagement of the overrunning clutch E or by clutching the sun gear with the carrier, as aforesaid.

The pumping means, generally designated at J, is preferably driven directly from driven shaft 25 although, if desired, the pumping means may be driven with any part which is drivingly connected to this shaft so as to produce pressure in response to motion of the vehicle. This pumping means is carried in a casing 92 secured at the rear of casing 49 and comprises a driving pump member 93 (Figs. 6 and 10) drivingly connected by ball 94 with the driven shaft 25, the member 93 having tooth-like projections 95 of a well known type adapted for driving engagement with corresponding recesses 96 in the pump driven member 97 which is eccentrically mounted in the casing 92, the recesses being one more in number than the teeth 95 as is common with the type of pump illustrated. A closure plate 98 is secured by fasteners 99 to the casing 92 and engages the forward faces of the pump members 93 and 97.

The casing 92 is provided with the crescent-shaped intake and pressure delivery ports 100 and 101 respectively, the intake port (Figs. 6 and 8) communicating with a downwardly extending passage 102 formed in casing 92 and which opens forwardly at its lower end with an intake chamber portion 103 formed by the bottom portion 104 of casing 49 and the chamber wall 105 cast therewith, the chamber portion 103 communicating freely at its forward outlet 106 with the reservoir or sump 107 in the casing 49. This reservoir preferably communicates by the system of passages at 108 through the casings 44 and 49 and the intermediate member 50, with the reservoir 45 in the main transmission B so that the lubricating oil stored therein may pass freely between the transmission mechanisms B and A.

The inlet chamber portion 103 functions, as will presently be apparent, to circulate the oil to the pump J from the motor G and also from the pump without first flowing to the motor G such additional oil as may be necessary being drawn from the reservoir 107. This has a particular advantage, especially in cold weather, in facilitating operation of the mechanism by quickly "warming-up" only a portion of the oil which is discharged by the pump J and led back to the pump in advance of warming-up all of the oil in the reservoirs 45 and 107. The oil is originally drawn from chamber 107 and flows through passage 102 to the pump inlet 100, the pump delivering the oil under pressure to the outlet port 101 whence the oil is delivered (Figs. 8 and 9) downwardly through a discharge passage 109 formed in casing 92 and then forwardly at the bottom of the passage to a delivery passage 110 formed in casing 49.

The delivery passage 110 (Figs. 8 and 10) extends transversely of the mechanism A to the side thereof opposite that which is viewed in Fig. 1 for delivery at 111 to the inlet 112 of my valving means K which is adapted to control the delivery of the pressure fluid from the pump to the motor G and also the venting of the fluid from the motor G directly back to the chamber portion 103 for recirculation to the pump J. Referring to Fig. 6, the casing 92 is adapted to receive the usual speedometer gears 113 and 114.

Referring to Figs. 6 and 9, I have provided means for relieving excess pressure fluid delivered by the pump comprising a valve casing 117 having a passage 118 open to the pressure delivery passage 109, the casing 117 being formed with a seat 119 for a ball valve 120 yieldingly urged toward seat 119 by a spring 121 whose compression is adjustably controlled by a threaded abutment plug 122. The valve casing is provided with the fluid escape ports 123. The seat 119 is off-center with respect to the axis of spring 121, this eccentric spring load for the ball 120 resulting in quietness at the relief valve and absence of vibration.

As will presently be more apparent, I have provided improved means for conveniently manipulating the mechanism A from the overdrive back to the direct drive whenever it is desired to accelerate the car more quickly than would be possible in the overdrive. By preference this means is, however, so arranged as not to function when the vehicle is travelling above a predetermined speed. My arrangement enables the use of the overdrive for city driving as well as for country driving and where my invention is used in conjunction with an overdrive I therefore preferably arrange the parts so that the overdrive will automatically take place at a car speed of 25 to 32 miles per hour, by way of example, the critical speed being preferably arranged at some definite relatively low vehicle speed in order to obtain the benefits of city driving. If desired, the parts may be arranged to provide for the overdrive at much higher car speeds in the neighborhood of 40 or 45 miles per hour, for example, or at any other desired speeds as will be presently more apparent.

Referring to Figs. 6, 7 and 11, the pressure fluid from the valving means K is delivered to the motor G by a port 125 which leads transversely inwardly of the transmission for delivery at 126 to a longitudinally extending passage 127 and thence through the communicating curved passage 128 for delivery at the rear end of cylinder 90. A plug 129 is secured by a fastener 130, this plug closing off the forward portion of the passage 127 which may be conveniently drilled from the forward end of the casing 49.

When the valving means K is operated, as will presently be apparent, to relieve the fluid pressure at motor G, then the fluid drains back through passages 128, 127 to the valve from whence the fluid drains through a port 131 and the inwardly extending drain passage 132 and thence through the rearwardly extending passage 133 which opens at 134 (Figs. 6 and 10) adjacent the inlet 106 of chamber portion 103 for recirculation to the pump J as aforesaid.

Referring to my valving means K I have illustrated a pressure fluid control device embodying a variety of interrelated functions of control for the change speed device A and while it is not necessary to include all of these functions, as will presently be more apparent, I have elected to illustrate these various functions inasmuch as they produce a novel and desirable control on the aforesaid change speed mechanism.

In general, the valving means K comprises a main valve adapted for automatic operation in response to a predetermined pressure of fluid delivered by the pump J for causing the valve to move with accelerated or snap action from a first position corresponding to the relatively slow speed drive through the mechanism A, viz., the direct drive, to a second position corresponding to the relatively fast speed drive which in the present instance is the overdrive.

I have also provided additional means in the form of a pair of valves each being adapted for operation under control of the vehicle driver independently of each other and independently of the movement of the main automatic valve. One of these driver-controlled valves may be conveniently termed a dash control and is adapted for manipulation by the vehicle driver at the dash or other convenient point and has the function of either allowing the main automatic valve to move in response to pressure fluid acting thereon or else to prevent movement thereof into the overdrive position under all conditions.

The other of the aforesaid driver-operated valves is arranged in series with the main valve and the dash control valve and by preference is operated in response to manipulation of the engine throttle valve by a suitable operating means which functions in response to manipulation of the usual accelerator pedal. I have so arranged this valve that it modifies the operation of the main valve both in controlling the step-up in the driving mechanism A in going from direct to overdrive and also for the step-down change in the drive in going from overdrive back to direct.

One preferred arrangement which I have illustrated in connection with the accelerator pedal operated valve is such that the main valve cannot move into its overdrive position until the accelerator pedal is approximately fully released. This has the advantage of preventing undesired fluctuations in the manipulation of the driving mechanism A and also insures a desirable slowing down of the engine when the overdrive is manipulated to effect a step-up in the drive and thereby assisting in the provision of a cushioning effect free from shock or jolt. A further function of the accelerator pedal controlled valve has to do with manipulating the mechanism A from overdrive back to direct drive independently of the pressure fluid which at such time may be such as to tend to hold the main valve in its overdrive position. This function may be termed a kick-down control for the mechanism A and I have so arranged the mechanism as to require the accelerator pedal to be depressed into a kick-down range of movement beyond the position of the accelerator pedal corresponding to wide open throttle by the provision of the suitable mechanism which accommodates an overtravelling of the accelerator pedal. I have also provided an arrangement such that when the vehicle is exceeding a predetermined relatively high speed accompanied by a relatively great discharge of fluid from the pump J, the mechanism A will not be manipulated for the change from overdrive back to direct even though the accelerator pedal is depressed to its kick-down position. This provides a feature of safety and under many conditions is preferred.

By arranging the kick-down control to function when the engine throttle valve is in its wide open throttle position, the mechanism A is manipulated from overdrive to direct accompanied by a natural tendency of the engine to speed up, thereby likewise assisting in the cushioning action of this speed ratio change just as in the case of the aforesaid change from direct to overdrive. The kick-down control will furthermore operate as a result of the natural impulse of the vehicle driver when faster acceleration or more favorable driving power is desired since under such conditions the driver will naturally depress the accelerator pedal. This kick-down control is very desirable in overtaking and passing other vehicles on the road and also to assist in climbing steep hills under the more favorable driving ratio of direct as compared with overdrive. Once the kick-down functions to change from overdrive to direct, my arrangement is such that the overdrive is not restored until the accelerator pedal is substantially fully released and provided, of course, that the car speed is sufficiently great at such time that sufficient pressure is delivered from the pump J that the automatic valve tends to effect the overdrive.

Additional functions and features of novelty of my valving means K will be apparent from the following detailed description of the illustrated embodiment thereof. Referring particularly to Fig. 11 and also to Figs. 12 to 19, the valving means comprises a main casing 135 adapted to be secured by fasteners 136 to the side of the mechanism A (see also Figs. 1, 8 and 10). The casing 135 has a front cover 137 secured thereto by fasteners 138 and 139, there being interposed between the cover and the casing a sealing plate 140.

The casing 135 is formed with a longitudinally extending bore 141 opening forwardly to the plate 140 and having a rear shoulder 142 and counterbore pressure chamber 143 which opens to the aforesaid delivery passage 112 leading from the exhaust port 101 of the pump J. Fixed within the bore 141 is a sleeve 144 which is disposed between plate 140 and shoulder 142, this sleeve being formed with the longitudinally spaced external annular fluid conducting grooves 145, 146 and 147. The annular groove 145 is opened radially inwardly through the sleeve 144 by reason of the ports 148 and the annular groove 146 opens inwardly through ports 149. The annular groove 147 is also opened inwardly of the sleeve by one or more ports 150.

The annular groove 145 is in continuous communication with an inwardly extending relief or venting passage 151 which is formed in the casing 135 and which communicates with a vent passage 152 formed in the casing 49 of the mechanism A and is adapted to deliver oil from the annular groove 145 to the discharge 153 (Fig. 6) located in the inlet chamber portion 103 so that the fluid discharged from the port 153 will be immediately circulated through passage 102 to the intake port 100 of the pump J.

At some suitable point in the flow of the fluid from the annular groove 145 back to the discharge 153, I provide an orifice preferably in the form of a thin plate illustrated at 154 in Fig. 14 between casings 135 and 49. This plate has a metering opening 155 preferably in the form of a frusto-cone so as to present a sharp edge and a minimum amount of surface to the flow of fluid from passage 151 to passage 152. The orifice 155 provides a restrictive vent for the fluid in the annular groove 145 for purposes which will be presently more apparent.

The annular groove 146 as best shown in Fig. 13 is in constant communication with the aforesaid fluid delivery passage 125 of the casing 135, this passage in turn communicating with the delivery passage 126 for supplying the pressure fluid to the motor G for operating the brake F. The annular groove 147 is in continuous communication with the aforesaid relief passage 131 of casing 135, this passage in turn communicating with the aforesaid passage 132 which conducts fluid back to the intake chamber portion 103.

Interposed between passages 131 and 132, I have positioned another thin plate orifice 156 having a sharp edge orifice opening 157 directed toward the flow of fluid from passage 131 whereby the annular groove 147 is restrictively vented along its line of fluid discharge. The orifice 157 is appreciably smaller than the aforesaid orifice 155 in order to effect certain desirable functions in the manipulation of the mechanism A as will be presently described.

Slidably disposed within the sleeve 144 is the main automatic valve L, this valve being illustrated in Fig. 11 in the direct drive position corresponding to the position of the parts of mechanism A as illustrated in Fig. 6. In this position the valve L is urged rearwardly against the shoulder 142 by a preloaded spring 158 which acts between the plate 140 and the valve. The valve L is hollow and is formed at its rear end with a high pressure chamber bore 159 which is open to the aforesaid pressure chamber 143, the valve having a plurality of radially extending passages 160 which open outwardly to the annular port 161 which in the Fig. 11 position communicates with the sleeve ports 148.

Spaced forwardly from the annular port 161 the valve L is provided with a relatively long annular port or groove 162 formed externally of the valve and, with the valve positioned as in Fig. 11, this groove 162 establishes communication between ports 149 and 150 thereby restrictively venting the motor G through the following system of passages and ports, namely, 128, 127, 126, 125, 146, 149, 162, 150, 147, 131, thence through the orifice 157 and passage 132 to the outlet at 134.

Spaced forwardly from the annular groove 162, the valve L is provided with an annular pressure relief groove 163 communicating inwardly through the radial passages 164 with the forward low pressure valve bore 165 open forwardly to the low pressure chamber 166 within the sleeve 144. In order to limit the forward movement of the valve L when the latter moves from the Fig. 11 position to the position thereof for supplying pressure fluid to the motor G (Fig. 18) I have provided a stop lug 167 carried by plate 140 and adapted to engage the forward end of the valve. The bore 159 is restrictively open to the bore 165 through a small lead passage 168 formed in the thimble 169 which is fixed between the bores.

When the valve L moves to its forward terminal position against the stop 167 then at such time the annular groove 163 registers with a vent passage 170 which extends inwardly through the casings 135 and 49 and discharge at 171 (Fig. 6) so that the oil flowing inwardly from the discharge 171 will collect in the oil reservoir 107 in the bottom portion 104 of the casing 49.

The sleeve 144 is formed with an upwardly extending relief passage 172 which, with the parts positioned as in Fig. 11, places the relief chamber 166 in communication with a corresponding passage 173 of the casing 135 adapted to conduct the oil under control of the kick-down valve M upwardly through the casing passage 174 and thence under control of the dash valve N to a drain or relief passage 176 which leads inwardly through casings 135 and 49 for discharge at 177 so that the oil will flow into the storage reservoir 107.

Referring now to the dash control and the valve N, this valve is slidably disposed in the bore 178 of casing 135, the bore being rearwardly closed at 179 at which point there is located a vent 180 similar to the vent 176 for draining any oil which may be trapped rearwardly of the valve N back to the reservoir 107. This vent 180, as shown in Fig. 13, communicates with the reservoir through a passage 181 of casing 135 and thence through the passage 182 formed in the casing 49 to the discharge or outlet 183 (Fig. 6).

The valve N is formed with the heads 184 and 185 slidable in bore 178 and between these heads this valve is provided with an annular groove 186 which, with the valve positioned as in Fig. 11, establishes communication between passage 174 and the vent at 176. Fixed to the head 185 is the rear end portion 187 of a Bowden wire mechanism 188 arranged to operate through the plate 140 and moving the valve from the Fig. 11 position to a position forwardly thereof when the head 184 will close the passage 174 and prevent the escape of fluid from this passage to the vent 176.

In order to conveniently control the operation of valve N, I have extended the Bowden wire 188 to the usual dash or instrument panel 189 (Fig. 1) where the Bowden wire terminates in a knob or a handle 190 adapted to be pulled by the driver. In order to releasably hold the valve N selectively in its two positions of adjustment, I have provided a spring pressed ball detent 191 selectively engageable with grooves 192 or 193 formed in the plunger portion 194 of the Bowden wire mechanism adjacent the knob 190 and slidable in the guide bracket 195 carried by the panel 189. In the Fig. 1 position, the knob is positioned inwardly corresponding to the Fig. 11 position of valve N and when the knob is pulled by the vehicle driver to register grooves 193 with the ball detent 191, then the valve head 184 will close the passage 174.

Referring now particularly to Figs. 1, 3, 4, 11 and 12, I will next describe the kick-down valve M and the means for controlling the operation of this valve in response to manipulation of the engine throttle valve by the vehicle driver. The valve M comprises a pair of longitudinally spaced heads 196 and 197 slidably fitting the casing bore 198. The head 196 is formed with an annular groove 199 which is adapted to establish communication between passages 173 and 174 only when the accelerator pedal is approximately fully released. At other times when the accelerator pedal occupies a position of throttle valve opening or when it is manipulated for the kick-down position, the annular groove 199 is not registered with passages 173 and 174 at which time the head 196 shuts off communication between these passages thereby closing the chamber 166 against escape of the fluid which is trapped therein when the valve L occupies its rearward Fig. 11 position.

The pressure chamber 143 adjacent the pressure fluid inlet 112 is provided with an upwardly extending branch passage 200 which is closed by the valve M at all times except when the accelerator pedal is depressed beyond the wide open throttle position for the kick-down operation. At such time the valve M is moved rearwardly to register an annular groove 202 formed in the head 197 with the aforesaid branch passage 200. At the same time the annular groove 202 communicates with a relief passage 203 which extends inwardly of the casing 135 and communicates with a passage 204 formed in the casing 49 so that the fluid passing through these passages is discharged through an outlet 205 for return to the reservoir 107 preferably at the point in the general neighborhood of the port 106 to the intake chamber 103.

The relief or vent thus provided from branch passage 200 to the outlet 205 is preferably of the orifice controlled type so as to provide a restrictive vent and to this end I have located a further thin plate orifice 206 between the passages 203 and 204, this plate having an opening 207 of the aforesaid type presenting a sharp edge toward the flow of fluid. The opening 207 may be approximately the same size as the opening 155 of the orifice plate 154 or it may be slightly larger or smaller than the latter opening in order to accomplish the illustrated functions of my controlling mechanism. The opening 157 of the orifice plate 156 is, however, preferably smaller than the orifice 155 so as to obtain the decided difference in the motor vehicle speed at which the valve L will return from the Fig. 18 position to the Fig. 11 position in comparison with the vehicle speed at which the valve L will move forwardly from the Fig. 11 position as will be presently more apparent.

At the forward end of the bore 198 the casing 135 is formed with an enlarged extension bore 208 slidably receiving a cylindrical member 209 having an annular flange or shoulder 210 yieldingly urged rearwardly against the casing shoulder 211 by a spring 212 which acts at its forward end against the plate 140. Whenever the accelerator pedal is depressed at any point throughout its throttle valve adjusting range, the spring 212 maintains the cylindrical member 209 against the shoulder 211 and the valve M is in the Fig. 11 position. The valve M has a forward terminal forked portion 213 pivotally connected by a pin 214 with a link 215 which extends forwardly through the plate 140 for pivotal connection by a pin 216 with a swinging plate member 217.

Figure 17:
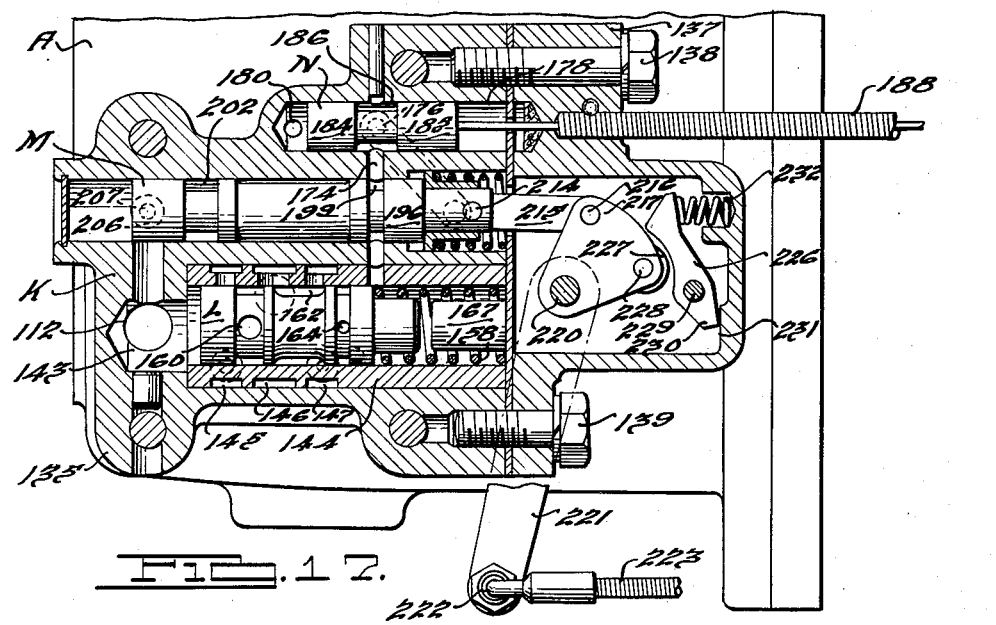
Fig. 17 is a view of the Fig. 11 pressure fluid control showing the main control valve at its momentary dwell point in moving from its Fig. 11 position to its Fig. 18 position and illustrating the kick-down valve in its position corresponding to full release of the accelerator pedal.

In order to vent the bore 208 to facilitate forward movement of the valve M from the Fig. 11 position thereof to the position illustrated in Fig. 17, which is brought about by fully releasing the accelerator pedal, the bore 208 opens into a passage 218 which extends inwardly of the casing 135 and communicates with an upwardly extending oblique passage 219 which in turn opens into the aforesaid vent 176 leading to the drain outlet 177. Other bores or chambers may be similarly vented in order to insure proper functioning of the parts as will be readily understood.

The plate 217 is fixed to a pivot pin 220 rockingly supported in the cover 137 and likewise secured to this pivot pin is a downwardly extending lever 221 having pivotal connection at 222 with the rear end of a Bowden wire mechanism 223.

The forward end of this Bowden wire mechanism has connection at 224 with the forwardly extending end of a lever 225.

In order to stabilize the action of the valve M particularly in the Fig. 11 position thereof against any tendency to move rearwardly or to the left as viewed in Fig. 11, I have illustrated a detent means in the form of a cam lever 226 adapted to act on a roller 227 supported at 228 by the plate 217. The lever 226 is rockingly mounted by a pin 229 supported in the cover 137 and has a downwardly extending end portion 230 adapted to strike the cover portion at 231 in order to limit counterclockwise swinging of the lever 226 under the action of the detent spring 232.

Figure 4:
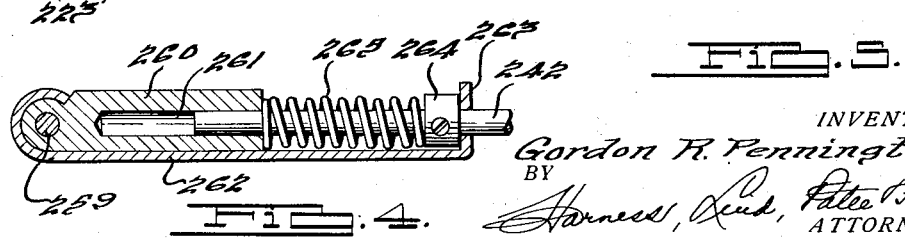
Fig. 4 is an enlarged sectional elevational view of the lost-motion connecting device in the throttle-operating mechanism of Fig. 1.

Referring now particularly to Figs. 1, 3 and 4, the lever 225 has its rearwardly extending end fixed to a shaft 233 which extends transversely of the vehicle beneath the usual toe board 234 and is suitably supported by the journalling brackets, one of which is illustrated in Fig. 3 at 235. Likewise fixed to the shaft 233 there is a downwardly extending sector 236 having an arcuate slot 237 whose center is at the axis of the shaft 233. This slot 237 slidably receives a pin 238 which is carried by and projects laterally from the lever 239 which is loosely supported at its upper end on the shaft 233.

At its lower end the lever 239 has articulated connection at 240 with a rearwardly extending link 241 and also with a forwardly extending link 242. The link 241 extends through an opening 243 in the toe board 234 and is connected at 244 with the accelerator pedal 245 yieldingly urged to its fully released position indicated at 246 by a spring 247.

In Fig. 3 I have illustrated several positions of the accelerator pedal 245 corresponding to functions of the control mechanism. Thus when the accelerator pedal occupies the position illustrated at 248, the engine throttle valve is wide open, suitable means being provided to accommodate overtravelling of the accelerator pedal beyond this wide open throttle position 248 for the kick-down operation at which time the accelerator pedal is moved to the position indicated at 249. The solid line showing of the accelerator pedal in Fig. 3 corresponds approximately to half throttle opening and when the accelerator pedal is released to the position indicated at 250 the arrangement is such that the kick-down valve M is about to be moved forwardly and does not move from the Fig. 11 position to the Fig. 17 position when the accelerator pedal is moved from the position 250 to the fully released position 246.

The arcuate slot 237 is of such length that when the accelerator pedal occupies the position 250 then the pin 238 engages the rear end of the slot so that when the accelerator pedal moves from the position 250 to the position 246, the segment 236 is picked up by the lever 239 and moved from the Fig. 3 position to the position indicated at 251, thereby causing the lever 225 to thrust through the Bowden wire mechanism 223 for moving the valve M forwardly from the Fig. 11 position to the Fig. 17 position. The slot 237 is also so arranged that when the accelerator pedal is depressed to the position 248 the pin 238 engages the forward end of this slot and when the accelerator pedal is further depressed to the kick-down position 249 the lever 239 then picks up the sector 236 and moves the same from the Fig. 3 position to the position illustrated at 252. During this latter movement of the sector 236, the lever 225 operates to exert a pull through the Bowden wire mechanism 223 in moving the kick-down valve M from the Fig. 11 position to the Fig. 19 position.

The link 242 extends forwardly for connection with the engine throttle valve through a lost motion device best illustrated in Fig. 4 which acts as a rigid connection when the accelerator pedal is operated throughout its throttle valve adjusting range but which allows the accelerator pedal to overtravel the throttle valve when the accelerator pedal moves from the wide open throttle position 248 to the kick-down position 249.

In Fig. 1 the engine C is illustrated as having the customary intake manifold 253 incorporating a riser 254 from the carburetor 255, the customary butterfly throttle valve 256 being operable by a lever 257. A stop 258 is adapted to engage the lever 257 when the throttle valve is in its wide open position. The lower end of lever 257 is pivotally connected by a pin 259 with a guide block 260 having a bore 261 slidably receiving the forward end of link 242.

A bracket 262 is secured to the forward end of block 260 and has a rear abutment flange 263 through which the link 242 slides, the latter link having a collar 264 fixed thereto and engageable with the forward face of the flange 263. A spring 265 acts between block 260 and collar 264 and is of sufficient strength to normally hold the parts 260 and 242 in their positions illustrated in Fig. 4, the spring being compressed to allow the link 242 to slide forwardly in the bore 261 of block 260 when the lever 257 is engaged with the stop 258 and when the accelerator pedal is operated to the aforesaid kick-down position 249. The spring 265 also has the function of preventing accidental kick-down of the accelerator pedal because of the resistance which it offers to movement of the accelerator pedal through the kick-down range over and above the resistance offered by the accelerator pedal return spring 247.

In describing the operation of the mechanism, I will assume, for purposes of illustration, that it is desired to provided for engagement of the transmission control device at brake F when the car registers a speed of 30 miles per hour and that once the brake is actuated it is desired to provide for automatic release thereof when the car slows down to 20 miles per hour unless the brake F is released sooner by the kick-down operation and that in such event the kick-down will not operate to effect a change in transmission A from overdrive to direct drive in the event that the car speed at the time of attempted kick-down exceeds 60 miles per hour. These figures are, of course, given entirely by way of example and may be varied if desired by changing the capacity of the pump J, the sizes of the various orifices and other elements which determine the operating functions of the mechanism.

In Figs. 1 to 16, the various parts are illustrated in their poistions of operations when the car is being driven forwardly in a direct drive through the main transmission B and the overdrive transmission A. It will also be noted that the accelerator pedal 245 is illustrated in Fig. 3 by the solid line position as being depressed to a position within the operating range of the throttle valve 256 whereby the pin 238 is positioned at a point intermediate the ends of the slot 237 of the sector 236. This allows the sector 236, lever 225, Bowden wire 223 and the valve M to assume positions as illustrated in Figs. 3 and 11, independently of any influence from the accelerator pedal. Thus the spring 232 and detent 226 will hold the valve M forwardly or to the right as viewed in Fig. 11 whereby the valve is urged against the flange 210 of the cylinder 209, further movement being prevented by the stronger opposing spring 212.

With the valve M thus positioned, this valve closes off communication between the pressure passage 200 and the kick-down orifice 207, the valve likewise closing off communication between vent passages 173 and 174 so that the relief chamber 166 to the right of valve L is closed off against escape of liquid therefrom. At this time the valve L occupies a position of venting the motor G inasmuch as the passage 125 which conducts pressure fluid to the motor is now open through the valve groove 147 to the venting orifice 157. The valve L also closes the drain passage 170.

Assuming that the car speed is below 30 miles per hour, the pump J will deliver fluid through the passages 109, 110, 111 and into high pressure chamber 143 whence the oil escapes through the valve groove 160, sleeve groove 145 and thence through the orifice 155 for return to the pump intake at the foreshaft. The oil in pressure chamber 143 also passes through the small bleed passage 168 and into the relief chamber 166 where the oil is trapped, thereby preventing movement of the valve L forwardly or to the right until the chamber 166 is vented and, of course, until the pressure of the fluid in the chamber 143 is sufficient to overcome the effect of the preloaded spring 158 as well as the orifice 155.

The valve L will maintain the Fig. 11 position at all times during manipulation of the accelerator pedal between the positions 248 and 250 even though the car speed exceeds the assumed critical speed of 30 miles per hour because such movement of the accelerator pedal does not operate the sector 236 and therefore the valve M remains in the Fig. 11 position preventing venting of the relief chamber 166. In the event that the accelerator pedal is at such time manipulated to the kick-down position 249, the valve M will be moved to the left so that groove 202 will establish communication between passage 200 and orifice 207 but obviously this will not have any effect on the valve L because this valve is already in the position established in direct drive in the mechanism A. In the event that the car speed increases so that pump J delivers pressure fluid in excess of the capacity of orifice 155, and with parts positioned as in Fig. 11, then the relief valve 120 (shown in Fig. 9) functions to relieve such excess pressure by unseating against its spring 121.

As the car starts up from rest, the flow of oil from the pump J increases very nearly proportionately to the car speed and the pressure which draws across orifice 157 increases as the square of the car speed. At a certain predetermined car sped, depending on the size of the pump J, the diameter of orifice 157, the area of the valve L, the preload of spring 158 and other apparent factors, the valve L will move forwardly to the right provided the pressure is relieved in the chamber 166. This car speed is assumed to be 30 miles per hour so that when this speed is reached, let us assume that the driver then releases the accelerator pedal to allow the same to move under the action of spring 247 to the fully released position thereof indicated at 246. When the pedal reaches the position 250, the stop 238 picks up the sector 236 and as the accelerator pedal moves to the position 248, the sector 236 is moved to the position 251.

This movement of the sector operates to push through the Bowden wire 223 to swing the lever 221 and the plate 217 as a unit in a clockwise direction, as viewed in Fig. 11, about the pivot 220, thereby causing the valve M to more forwardly against the spring 212 which is relatively weaker than the spring 247 until the valve M occupies the position illustrated in Fig. 17.

At this time the plate 217 is carried free of the detent 226 and the valve M continues to close the upper end of pressure passage 200. However, the valve groove 199 is now moved into alignment with passages 173 and 174 so that these passages establish communication between chamber 166 and the vent at 176, it being assumed that the dash control valve N has been left in the position illustrated in Fig. 11. Venting of the chamber 166 can at all times be prevented by the operator pulling the knob 190 so that the head 184 of valve N closes the upper end of vent passage 174 so that regardless of the position of valve M, the chamber 166 canont be vented and the valve L will not under any conditions move from the Fig. 11 position. In this manner I have provided a convenient means of maintaining the mechanism A in direct drive.

As soon as the valve M is moved from its Fig. 11 position to its Fig. 17 position to vent the chamber as aforesaid, the valve L will start to move to the right due to a pressure differential between its ends at chambers 143 and 166, this pressure differential being greater than the preload of spring 158 and the first effect of this valve movement will be to partially block off the oil flow through the sleeve ports 148. This will cause the pressure in the chamber 143 to increase additionally and thereby cause the valve L to move further and faster to the right. Movement of the valve L will be forced, after it once starts moving, until the oil flow is changed by cutting off the flow through the ports 148 and opening the ports 149 to the pressure chamber 143 by registration of the latter ports with the annular groove 161 of the valve L.

It might be noted at this point that the area of the passages 172, 173 and 174 are preferably so much greater than the area of the bleed passage 168 that when the chamber 166 is vented the pressure in this chamber will be dropped to a negligible value. The valve L thus moves to the right until it assumes the position illustrated in Fig. 17 which might be termed an intermediate dwell point of momentary duration during movement of the valve from the direct drive position in Fig. 11 to the overdrive position of Fig. 18. At this point the valve has moved to close off the sleeve ports 148 to shut off the flow through the restrictive vent and orifice 155 and the annular valve groove 161 is slightly open to the sleeve ports 149 for supplying the pressure fluid from the chamber 143 to the motor G.

As this takes place the valve momentarily hesitates at this point because of the pressure drop in the chamber 143 due to opening of the pressure chamber to the supply line leading to the motor G. At the same time the valve groove 162 is open through sleeve ports 150 to the restrictive vent through orifice 157 so that a portion of the fluid flow is vented through this orifice during the time that the supply line to the motor G is filling and effecting engagement of the brake F against the resistance of the springs 87 and 78.

I have found that the pressure moves the valve

L as aforesaid and good results are obtained by roughly a third of the oil delivered at the valve groove 162 passing through the orifice 157 which, of course, leaves the bulk of the oil for delivery to the motor G for applying the brake. Thus the orifice 157 functions to prevent a water hammering effect while the line is filling to the motor G and I have thus provided several distinct cushioning effects for engaging the brake F. One of these cushions functions by reason of the orifice 157 taking a part of the oil which is suddenly admitted to the ports 149 while the other cushioning effect is supplied by reason of the springs 87 and 78 being further compressed during the engagement of the brake F.

As soon as the brake discs are engaged with each other at the brake F, then at this instant the pressure in the delivery passage 125 rises rapidly and the valve L is thereby pulled further to the right as a result of the increased pressure resulting in an increase of the flow of the oil through the orifice 157 which further cushions the final stages of the engagement of the brake F and results in what may be termed a dash pot action of the engagement of the brake. At this time the valve L is moved to the Fig. 18 position from which it will be noted that the orifice 157 continues to restrictively vent the passage 125 while the ports 148 continue to be closed by the valve L.

By preference, the length of the annular groove 161 is about equal to or slightly less than the longitudinal distance between the sleeve ports 148 and 149 to facilitate rapid movement of the valve L to the right to attain a more positive snap action in the valve movement. When the valve L has been moved to the Fig. 18 position, it will be noted that this movement is limited by the stop 167 and that at this time the relief passage 172 is closed by the valve and also that the valve groove 163 is now aligned with the vent passage 170 which preferably has substantially the same capacity of the system of vent passages 172, 173 and 174. In this manner the chamber 166 is now open to the drain passage 170 independently of the drain and the annular groove 199 of the valve M and the accelerator pedal may therefore be depressed while maintaining the chamber 166 vented.

Figure 18:
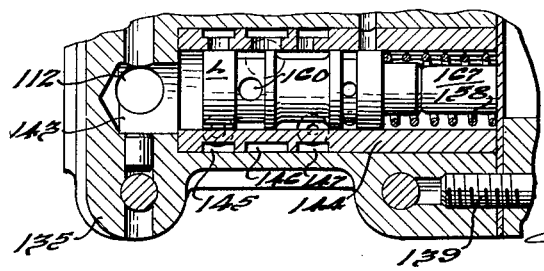
Fig. 18 is a view of a portion of the Fig. 11 pressure fluid control showing the main control valve in its position during operation of the overdrive.

The orifice 157 is appreciably smaller than the orifice 155 so that if the car speed was sufficient to overcome the flow through the orifice 155 and thereby move the valve L to the right, then it will be more than sufficient to maintain the valve L to the right in the Fig. 18 position and thereby prevent a hunting tendency of the valve. Furthermore, the orifice 157 controls the speed at which the valve will automatically return to the Fig. 11 position in response to a drop in pressure in the chamber 143 for effecting a change in the mechanism A from the overdrive to the direct drive. This will take place preferably at a lower car speed than that at which the overdrive will engage and is preferably in the neighborhood of 16 to 20 miles per hour, the latter figure earlier having been referred to for purposes of illustration.

I preferably employ a preloaded type of spring 158 as this has important commercial aspects in keeping down the size of travel of the valve L and also provides better automatic snap action of the valve when it starts to move.

With the valve L in the Fig. 18 position for driving the mechanism A and the overdrive, let it be assumed that the driver does not depress the accelerator pedal to the kick-down position at 249 but that the car speed drops below the assumed 20 miles per hour with a corresponding drop in the pressure of chamber 143 whereupon the spring 158 comes into action to restore the valve L from the Fig. 18 position to the position illustrated in Fig. 11, thereby venting the motor G and again opening the chamber 143 to the restrictive vent through the orifice 155. In this manner the mechanism A is automatically operated for a step-down in the speed ratio drive in response to some predetermined point preferably lower than that at which the step-up of the speed ratio in mechanism A takes place.

Let it now be assumed that the valve L is in the overdrive position illustrated in Fig. 18 and that the accelerator pedal 245 is at some point intermediate the positions 246 and 248 with the car travelling at a relatively high speed such as 45 miles per hour for example. Under such conditions the driver may at any time effect movement of the valve L back to the Fig. 11 position for restoring the direct drive from the mechanism by depressing the accelerator pedal to the kick-down position 249 thereby maintaining the throttle valve 256 in its wide open position and move the sector 236 by going to the position thereof at 252, the lost motion device in Fig. 4 operating by compression of the operation of spring 265 to accommodate this operation.

Figure 19:
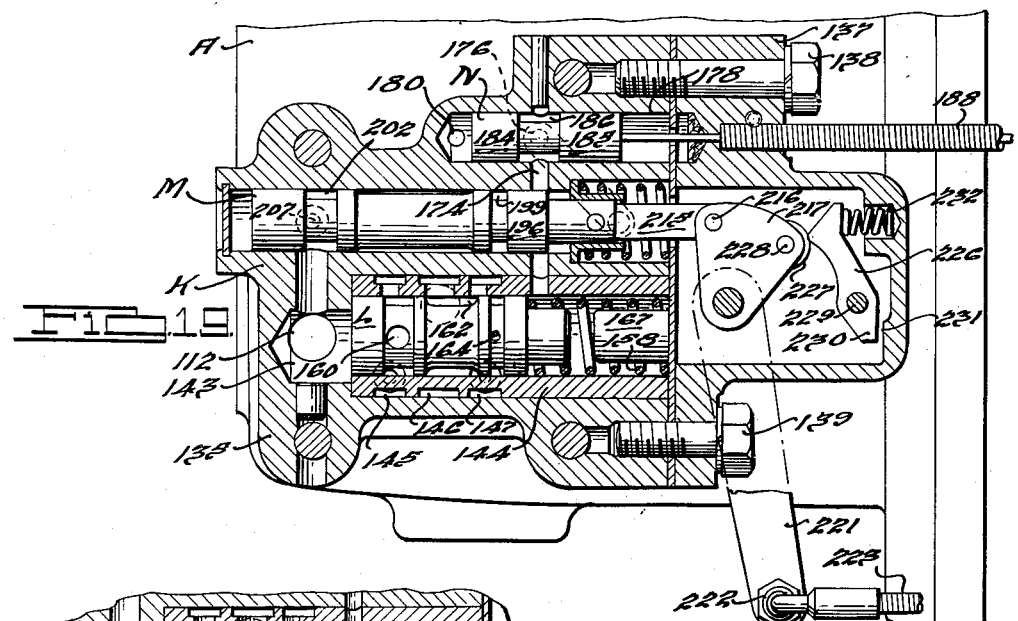
Fig. 19 is a view of the Fig. 11 pressure fluid control showing the kick-down valve in its position corresponding to full depression of the accelerator pedal beyond its wide open throttle position, the main control valve being shown in its restored Fig. 11 position releasing the overdrive.

This kick-down operation pulls through the Bowden wire 223 to move the valve M to the left until it occupies the position thereof illustrated in Fig. 19 from which it will be noted that the vent passage 173 is maintained closed by the valve M while the annular groove 202 of the valve M is moved to establish communication between the branch pressure passage 200 and the restrictive vent through the orifice 207. This orifice has sufficient capacity to vent the pressure chamber 143 to allow the spring 158 to move the valve L to the Fig. 11 position although, as aforesaid, the orifice 207 will preferably not accommodate such venting of the chamber 143 when the car speed is in excess of a predetermined value such as 60 miles per hour for example. In the illustrated car speed of 45 miles per hour and with the kick-down of the valve M to the Fig. 19 position, the valve L will be restored to the Fig. 11 position, thereby effecting a step-down in the mechanism A from the overdrive to the direct drive. When the kick-down has thus been operated by the pin 238 moving the sector 236 to the position 252, my arrangement is such, by preference, that the valves L and M will be left in the Fig. 19 position until the accelerator pedal is substantially fully released. When the valve M is in the Fig. 19 position, it will be noted that the detent 226 acts to prevent this valve from moving to the right when the accelerator pedal is released from the position 249 so that the valve will stay in the Fig. 19 position until the accelerator pedal approaches the position 250 at which time the pin 238 will engage the right hand end of the slot 237 and cause the lever 236 to move the lever 221 clockwise as viewed in Fig. 19, thereby releasing the plate 217 from the detent 226. Then as the accelerator pedal is further released from the position 250 to the position 246, the valve M is forced to move as aforesaid into the Fig. 17 position for venting the chamber 166 and thereby allowing the valve L to move to the right to again restore the overdrive in mechanism A.

I preferably employ a sharp edge orifice conduit at 155, 157 and 207 in order to minimize the effect of temperature changes on the function of my pressure fluid controlling mechanism. Any oil passage will offer two kinds of resistance to the fluid flow, one of which is due to the viscosity of the oil and the other has to do with the kinetic effects of the oil flow. The viscosity factor varies greatly with the temperature changes when the usual fluids employed in transmission control are used. The kinetic effects on the other hand vary only as the density of the liquid is changed and this is such a small factor as to be negligible within the limits of temperature variation ordinarily dealt with and experienced with motor vehicle operation.

A sharp edge orifice has a minimum of length and surface over which the oil is in shear and therefore presents a minimum of variation due to the viscosity effect and thus this type of orifice presents a minimum total variation allowing a wide selection of fluids without corresponding variation in the operation of the device. The sharp edge orifice therefore carries the desirable effects substantially to the point where the mechanism controlled by the valving device K functions just the same in summer as in winter and for all practical purposes the same regardless of the density of the liquid employed, thereby making my control mechanism especially suited for commercial use. By substituting other sized orifices for those illustrated, I can, of course, obtain a wide variation in the functions of the mechanism as will be readily understood. The desired effects can be approached by the use of a thin plate orifice although I prefer to additionally provide the sharp edge of orifice opening in order to still further render the apparatus free from temperature variations and changing density in the oil medium.

Referring to the modified arrangement illustrated in Figs. 20 and 21, I have shown my valving device K' modified by the provision of a continuously open vent for the relief chamber 166, thereby dispensing with the aforesaid annular groove 199 in the kick-down valve M and also eliminating the bleed passage 168 and the provision of the dash control N. This arrangement also is preferably accompanied by the elimination of the free center function of the kick-down valve while the accelerator pedal is manipulated throughout the throttle opening range because now the accelerator pedal does not control the venting of the chamber 166. Inasmuch as most of the parts are identical in general function and structure with the corresponding parts aforesaid, I have provided the same reference characters to Figs. 20 and 21 for such parts and will only describe such differences as may occur over the Fig. 11 type of mechanism.

In Figs. 20 and 21, the main valve L' is free to move to the right at any time when the fluid pressure in the chamber 143 rises sufficiently to overcome the resistance of the preloaded spring 158 provided of course that the kick-down valve M' is in the kick-down position which is illustrated in Fig. 20. This valve movement may take place by reason of the chamber 166 being vented at all times through the sleeve and casing passages 270 and 271, respectively, the latter opening to the bore 272 for slidably receiving the valve M'. This bore is continuously open to the vent passage 273 which leads to the reservoir 107 in the same manner as previously referred to in connection with the vent passages 176 and 180 for example. The valve M' is now connected through a link 274 with a lever 275 which takes the place of the aforesaid plate 217 and is likewise fixed through the pivot shaft 276 with the upper end of a lever 277 which takes the place of the aforesaid lever 221 and is likewise adapted for actuation by connection with the Bowden wire mechanism 223.

The accelerator pedal 278 is illustrated in the kick-down position having been moved from the wide open throttle position 279 for causing the pin 280 to pick up the sector 281. Assuming that the parts are positioned as illustrated in Figs. 20 and 21, it will therefore be apparent that the vehicle driver has depressed the accelerator pedal to the position 279 for pulling through the Bowden wire 223 to move the kick-down valve M' to the left, thereby venting the pressure chamber 143 and allowing the valve L' to move from the overdrive position to the direct drive position in approximately the same manner as described, it being noted that by preference the restrictive vent of the chamber 143 is obtained by the aforesaid orifice 207.

When the driver releases the accelerator pedal from the kick-down position, the pin 280 will move in the sector slot 282 allowing the sector 281 and valve M' to stay in the illustrated positions until, just before the accelerator pedal is fully released, the pin 280 engages the right hand end of slot 282 so as to pick up the sector 281 and pull through the Bowden wire 223 and thereby move the valve M' to the right for closing the pressure branch passage 200 as before described.

When releasing the accelerator pedal from the kick-down position, the valve L' will then immediately move to the right, provided of course that the car speed is such to cause delivery of oil in chamber 143 at a pressure sufficient to overcome the effect of spring 158 and the restrictive vent through the orifice at 155, and thereby cause the mechanism A to change from the direct drive to the overdrive.

Referring to the embodiment of my invention illustrated in Figs. 22 to 24, I have arranged my pressure fluid control device for effecting automatic engagement and disengagement of a clutch disposed at some point in the line of power transmission of the engine drive to the motor vehicle. In the particular embodiment illustrated, I have provided a drive to the pump taken from a part which operates at a speed proportionate with the engine speed so that the clutch will function in relationship with the engine speed rather than with the car speed as in the earlier embodiment. One desirable application of such an arrangement is in connection with a drive embodying a fluid coupling in connection with which difficulty has been experienced by reason of the inherent drag in the coupling making it difficult to release the drive through the coupling when the engine is idling or running at relatively low speed.

In the present embodiment of my invention, I have therefore provided a novel arrangement of interposing a pressure fluid operated clutch in the line of drive between an engine driven fluid coupling and a power delivery device preferably in the form of any suitable type of transmission together with my fluid control mechanism so arranged that when the engine speed decreases to a predetermined value, say in the neighborhood of 500 to 600 R. P. M., the automatic valve will operate to release the clutch in substantially the same manner that the brake F was released by the automatic valve in the earlier embodiment of my invention. Also, when the engine speed increases above the aforesaid predetermined value, then the automatic valve will operate to bring about engagement of the clutch, the arrangement being such that the drive to the transmission is automatically interrupted when the engine idles, thereby eliminating the drag effect through the fluid coupling to the transmission. Instead of the kick-down valve being operated in conjunction with the accelerator pedal, I have now connected this valve with a pedal which functions somewhat like an ordinary clutch pedal in that it can be operated at any time to bring about a release of the drive between the engine and the transmission.

Referring to Figs. 22 to 24, the engine C now drives the impeller member 290 of the fluid coupling N, this impeller having the well-known vanes 291 for guiding fluid contained in the coupling outwardly by centrifugal force toward a runner member 292 having similar vanes 293.

The runner member 292 is fixed to the driven shaft 294 which drives the friction plates 295 of the clutch O. This clutch has a driven member 296 carried as a part of the shaft 297 which preferably is the input shaft to any suitable type of transmission generally designated at P from whence the drive passes through the output shaft 298 for driving the ground wheels of the motor vehicle.

The clutch driven member 296 drivingly carries the driven friction members 299 and 300, the latter comprising a pressure plate movable rearwardly to pack the driving and driven clutch plates for engaging the clutch. Clutch engagement is effected by rearward movement of an annular piston 301 slidably arranged in the annular cylinder 302 having a fluid inlet 303 leading to the valving means K' which is substantially identical with that illustrated in Fig. 20. In other words, the pressure fluid outlet 125 of Fig. 20 now leads to the cylinder 302 of Fig. 22 while the pressure fluid delivered to the valving device K' is now admitted through a pipe 304 from an suitable type of pump 305 arranged in the reservoir or sump 306 of the casing structure 307.

The pump 305 is driven by a gear 306' meshing with driving gear 307' carried by the rear cover member 308 which is formed as a part of or is secured to the impeller 290 and therefore drives with the engine C.

A portion of the valving means K' is illustrated in Fig. 23 and differs only from that illustrated in Fig. 20 in the following respects. Instead of a restrictive vent cooperating with the annular groove 202 of the valve M', I now preferably provide a freely open vent for the passage 200 through the passages 309 and 310 so that the main valve L' may be returned to the position illustrated in Fig. 20 independently of car and engine speed whenever the valve M' is moved to the position shown in Fig. 23. Also in this arrangement, the lever 277 of Fig. 20 is now replaced by a clutch pedal 311 normally returned by a suitable spring diagrammatically illustrated at 312 which tends to move the valve M' to the right for closing off the passage 200 and maintaining the main valve L' in its position against the stop 167 whenever the pressure of the fluid in the chamber 143 is sufficient to move the valve against the action of the preloaded spring 158.

In the operation of the embodiment illustrated in Figs. 22 to 24, let us assume that the vehicle is at rest. If desired, the clutch pedal 311 may be depressed in starting the engine or of course the engine may be set with the transmission P set for neutral so that the car will not start on starting the engine. When the engine is started with the pedal 311, the transmission P may be manipulated to any desired drive from shaft 297 to shaft 298 and the engine accelerated in the usual manner as the clutch pedal 311 is released. As the speed of the engine increases above its idling point, the main valve L' will move to the right and will cause the fluid pressure to be delivered from the supply pipe 304 to the delivery pipe 303 for engaging the clutch O and establishing a drive from the engine to the output shaft 298. During this time the fluid coupling N operates in the customary manner to decrease the slip therethrough as the speed of the engine increases.

When it is desired to manipulate the transmission P for changing the gear ratios therein, the pedal 311 may be depressed to vent the pressure chamber 143 through the passages 309 and 310, thereby causing the clutch O to disengage for the purpose of shifting gears in the transmission P.

When the vehicle is brought to a temporary stop as when the car approaches a red traffic signal for example, the transmission may be left in gear if desired and as the brakes are applied to the vehicle and the engine speed is brought down approximately to its idling condition, the pressure of the fluid delivered by the pump 305 will have diminished sufficiently to enable the spring 158 to return the valve L' to the Fig. 20 position, thereby venting the cylinder 302 for causing the clutch O to disengage. In this manner, the engine C is released from the output shaft 298 and the valving device K' acts as an automatic control on the drive in response to idling of the engine. When the traffic light shows green, then the driver need only to accelerate the engine C causing a corresponding increase in pressure fluid delivered from the pump 305 to the pressure chamber 143 thereby causing the valve L' to move to the right and admit the pressure fluid to the cylinder 302 for engaging the clutch O preferably through the cushioning means afforded by the restrictive vent at the orifice 157 which functions in a manner generally similar to that in connection with the Fig. 11 device.

Various other applications of my improved valving device will be readily apparent from the foregoing illustrative embodiments and also various changes in the details of construction and mode of operation may be apparent from my description and it is not my intention to limit my invention apart from the scope afforded by the appended claims within the broader aspects of my invention.

I claim:

1. In a power transmission control mechanism of the character described having a pressure fluid operated device comprising relatively rotatable frictionally engageable elements for controlling drive transmission between driving and driven shafts of a motor vehicle, a source of fluid supply, a pump for delivering the fluid under pressure from said supply, means for driving said pump at a speed proportionate to one of said shafts for delivering the fluid under pressure varying with the speed of this shaft, a valve adapted for movement from a first position of venting said device thereby to accommodate relative disengagement of said elements, to a second position for establishing communication between the pressure fluid delivered by the pump and said device for causing relative engagement of said elements, a spring yieldingly urging said valve to its said first position, means under control of said valve for venting said device to accommodate relative disengagement of said elements when said valve is in its said first position, means for conducting the pressure fluid from said pump to said valve for causing movement of said valve to its said second position in opposition to said spring when the conducted fluid reaches a predetermined pressure, means under control of said valve for conducting the pressure fluid delivered by said pump to said device when said valve is moved to its said second position, and means for restrictively venting the last said fluid conducting means so arranged as to cushion said relative engagement of said elements when said valve is moved to its said second position.

2. In a power transmission control mechanism of the character described having a pressure fluid operated device comprising relatively rotatable frictionally engageable elements for controlling drive transmission between driving and driven shafts of a motor vehicle, a source of fluid supply, a pump for delivering the fluid under pressure from said supply, means for driving said pump at a speed proportionate to one of said shafts for delivering the fluid under pressure varying with the speed of this shaft, a valve adapted for movement from a first position of venting said device thereby to accommodate relative disengagement of said elements, to a second position for establishing communication between the pressure fluid delivered by the pump and said device for causing relative engagement of said elements, a spring yieldingly urging said valve to its said first position, means under control of said valve for venting said device to accommodate relative disengagement of said elements when said valve is in its said first position, means for conducting the pressure fluid from said pump to said valve for causing movement of said valve to its said second position in opposition to said spring when the conducted fluid reaches a predetermined pressure, means under control of said valve for conducting the pressure fluid delivered by said pump to said device while said valve moves from its said first position toward its said second position, and means for restrictively venting the last said fluid conducting means to cause said valve to momentarily dwell in a position thereof intermediate its said first and second positions thereby cushioning said relative engagement of said elements.

3. In a power transmission control mechanism of the character described having a pressure fluid operated device for controlling drive transmission between driving and driven shafts of a motor vehicle, a source of fluid supply, a pump for delivering the fluid under pressure from said supply, means for driving said pump at a speed proportionate to one of said shafts for delivering the fluid under pressure varying with the speed of this shaft, a pressure fluid chamber to which the pressure fluid is delivered from said pump, a pressure fluid relief chamber restrictively communicating with said pressure chamber and adapted to be vented, a valve between said chambers and having opposed portions thereof respectively subjected to the fluid in said chambers, a spring yieldingly acting on said valve, said valve being adapted for movement by the fluid in said pressure chamber from a first position of venting said device to a second position for establishing communication between said pressure chamber and said device for causing operation of said device, means controlled by said valve for restrictively venting said pressure chamber, said spring and said pressure chamber venting means acting to prevent said movement of said valve until the fluid in said pressure chamber reaches a predetermined pressure, and means under control of said valve for conducting the pressure fluid from said pressure chamber to said device when said valve is moved to its said second position.

4. In a power transmission control mechanism of the character described having a pressure fluid operated device for controlling drive transmission between driving and driven shafts of a motor vehicle, a source of fluid supply, a pump for delivering the fluid under pressure from said supply, means for driving said pump at a speed proportionate to one of said shafts for delivering the fluid under pressure varying with the speed of this shaft, a pressure fluid chamber to which the pressure fluid is delivered from said pump, a pressure fluid relief chamber restrictively communicating with said pressure chamber and adapted to be vented, a valve between said chambers and having opposed portions thereof respectively subjected to the fluid in said chambers, a spring yieldingly acting on said valve, said valve being adapted for movement by the fluid in said pressure chamber from a first position of venting said device to a second position for establishing communication between said pressure chamber and said device for causing operation of said device, orifice means controlled by said valve for restrictively venting said pressure chamber when said valve is in its said first position, said spring and orifice means being adapted to prevent said movement of said valve until the fluid in said pressure chamber reaches a predetermined pressure, means under control of said valve for conducting the pressure fluid from said pressure chamber to said device when said valve is moved to its said second position, and orifice controlled means for restrictively venting the last said fluid conducting means for cushioning the operation of said device when said valve is moved to its said second position.

5. In a power transmission control mechanism of the character described having a pressure fluid operated device for controlling drive transmission between driving and driven shafts of a motor vehicle, a source of fluid supply, a pump for delivering the fluid under pressure from said supply, means for driving said pump at a speed proportionate to one of said shafts for delivering the fluid under pressure varying with the speed of this shaft, a pressure fluid chamber to which the pressure fluid is delivered from said pump, a valve having a portion thereof subjected to the fluid in said chamber for causing movement of said valve from a first position of venting said device to a second position for establishing communication between said pressure chamber and said device for causing operation of said device, a spring yieldingly opposing said movement of said valve, means under control of said valve for restrictively venting said pressure chamber when said valve is in its said first position, and means operative under control of said valve for conducting the pressure fluid from said pressure chamber to said device during said movement of said valve, said valve being moved as aforesaid in response to predetermined pressure of the fluid in said pressure chamber to close said pressure chamber venting means and render the last said pressure fluid conducting means operative to conduct pressure fluid to said device.

6. In a power transmission control mechanism of the character described having a pressure fluid operated device for controlling drive transmission between driving and driven shafts of a motor vehicle, a source of fluid supply, a pump for delivering the fluid under pressure from said supply, means for driving said pump at a speed proportionate to one of said shafts for delivering the fluid under pressure varying with the speed of this shaft, a pressure fluid chamber to which the pressure fluid is delivered from said pump, a valve having a portion thereof subjected to the fluid in said chamber for causing movement of said valve from a first position of venting said device to a second position for establishing communication between said pressure chamber and said device for causing operation of said device, a spring yieldingly opposing said movement of said valve, orifice means under control of said valve for restrictively venting said pressure chamber when said valve is in its said first position, means operative under control of said valve for conducting the pressure fluid from said pressure chamber to said device during said movement of said valve, said valve being moved as aforesaid in response to predetermined pressure of the fluid in said pressure chamber to close said pressure chamber venting means and render the last said pressure fluid conducting means operative to conduct pressure fluid to said device, and orifice means for restrictively venting the last said fluid conducting means for cushioning the operation of said device when said valve is moved as aforesaid.

7. In a power transmission control mechanism of the character described having a pressure fluid operated device for controlling drive transmission between driving and driven shafts of a motor vehicle, a source of fluid supply, a pump for delivering the fluid under pressure from said supply, means for driving said pump at a speed proportionate to one of said shafts for delivering the fluid under pressure varying with the speed of this shaft, a valve adapted for movement from a first position of venting said device to a second position for establishing communication between the pressure fluid delivered by the pump and said device for causing operation of said device, a spring yieldingly urging said valve to its said first position, means under control of said valve for venting said device to afford release thereof when said valve is in its said first position, means for conducting the pressure fluid from said pump to said valve for causing movement of said valve to its said second position in opposition to said spring when the conducted fluid reaches a predetermined pressure, means under control of said valve for conducting the pressure fluid delivered by said pump to said device when said valve is moved to its said second position, and means operable at the will of the vehicle driver for restrictively venting the first said fluid conducting means independently of said valve.

8. In a power transmission control mechanism of the character described having a pressure fluid operated device for controlling drive transmission between driving and driven shafts of a motor vehicle, a source of fluid supply, a pump for delivering the fluid under pressure from said supply, means for driving said pump at a speed proportionate to one of said shafts for delivering the fluid under pressure varying with the speed of this shaft, a valve adapted for movement from a first position of venting said device to a second position for establishing communication between the pressure fluid delivered by the pump and said device for causing operation of said device, a spring yieldingly urging said valve to its said first position, means under control of said valve for venting said device to afford release thereof when said valve is in its said first position, means for conducting the pressure fluid from said pump to said valve for causing movement of said valve to its said second position in opposition to said spring when the conducted fluid reaches a predetermined pressure, means under control of said valve for conducting the pressure fluid delivered by said pump to said device when said valve is moved to its said second position, orifice controlled venting means for the fluid conducted to said valve, and valving means operable under control of the vehicle driver for controlling the last said venting means.

9. In a power transmission control mechanism of the character described having a pressure fluid operated device for controlling drive transmission between driving and driven shafts of a motor vehicle, a source of fluid supply, a pump for delivering the fluid under pressure from said supply, means for driving said pump at a speed proportionate to one of said shafts for delivering the fluid under pressure varying with the speed of this shaft, a pressure fluid chamber to which the pressure fluid is delivered from said pump, a pressure fluid relief chamber restrictively communicating with said pressure chamber and adapted to be vented, a valve between said chambers and having opposed portions thereof respectively subjected to the fluid in said chambers, a spring yieldingly acting on said valve, said valve being adapted for movement by the fluid in said pressure chamber from a first position of venting said device to a second position for establishing communication between said pressure chamber and said device for causing operation of said device, said spring preventing said movement of said valve until the fluid in said pressure chamber reaches a predetermined pressure, means under control of said valve for conducting the pressure fluid from said pressure chamber to said device when said valve is moved to its said second position, and means operable at the will of the vehicle driver for restrictively venting said pressure chamber independently of said valve.

10. In a power transmission control mechanism of the character described having a pressure fluid operated device for controlling drive transmission between driving and driven shafts of a motor vehicle, a source of fluid supply, a pump for delivering the fluid under pressure from said supply, means for driving said pump at a speed proportionate to one of said shafts for delivering the fluid under pressure varying with the speed of this shaft, a pressure fluid chamber to which the pressure fluid is delivered from said pump, a valve having a portion thereof subjected to the fluid in said chamber for causing movement of said valve from a first position of venting said device to a second position for establishing communication between said pressure chamber and said device for causing operation of said device, a spring yieldingly opposing said movement of said valve, means under control of said valve for restrictively venting said pressure chamber when said valve is in its said first position, means operative under control of said valve for conducting the pressure fluid from said pressure chamber to said device during said movement of said valve, said valve being moved as aforesaid in response to predetermined pressure of the fluid in said pressure chamber to close said pressure chamber venting means and render the last said pressure fluid conducting means operative to conduct pressure fluid to said device, and means operable at the will of the vehicle driver independently of said pump and said valve for relieving the pressure of the fluid in said pressure chamber sufficiently to cause said spring to return said valve to its said first position.

11. In a power transmission control mechanism of the character described having a pressure fluid operated device for controlling drive transmission between driving and driven shafts of a motor vehicle, a source of fluid supply, a pump for delivering the fluid under pressure from said supply, means for driving said pump at a speed proportionate to one of said shafts for delivering the fluid under pressure varying with the speed of this shaft, a pressure fluid chamber to which the pressure fluid is delivered from said pump, a pressure fluid relief chamber restrictively communicating with said pressure chamber and adapted to be vented, a valve between said chambers and having opposed portions thereof respectively subjected to the fluid in said chambers, a spring yieldingly acting on said valve, said valve being adapted for movement by the fluid in said pressure chamber from a first position of venting said device to a second position for establishing communication between said pressure chamber and said device for causing operation of said device, said spring preventing said movement of said valve until the fluid in said pressure chamber reaches a predetermined pressure, means under control of said valve for conducting the pressure fluid from said pressure chamber to said device when said valve is moved to its said second position, and means operable under control of the vehicle driver for venting said relief chamber to permit said movement of said valve.

12. In a power transmission control mechanism of the character described having a pressure fluid operated device for controlling drive transmission between driving and driven shafts of a motor vehicle, a source of fluid supply, a pump for delivering the fluid under pressure from said supply, means for driving said pump at a speed proportionate to one of said shafts for delivering the fluid under pressure varying with the speed of this shaft, a pressure fluid chamber to which the pressure fluid is delivered from said pump, a pressure fluid relief chamber restrictively communicating with said pressure chamber and adapted to be vented, a valve between said chambers and having opposed portions thereof respectively subjected to the fluid in said chambers, a spring yieldingly acting on said valve, said valve being adapted for movement by the fluid in said pressure chamber from a first position of venting said device to a second position for establishing communication between said pressure chamber and said device for causing operation of said device, said spring preventing said movement of said valve until the fluid in said pressure chamber reaches a predetermined pressure, means under control of said valve for conducting the pressure fluid from said pressure chamber to said device when said valve is moved to its said second position, vent means for said relief chamber, and valving means for controlling said relief chamber vent means.

13. In a power transmission control mechanism of the character described having a pressure fluid operated device for controlling drive transmission between driving and driven shafts of a motor vehicle, a source of fluid supply, a pump for delivering the fluid under pressure from said supply, means for driving said pump at a speed proportionate to one of said shafts for delivering the fluid under pressure varying with the speed of this shaft, a pressure fluid chamber to which the pressure fluid is delivered from said pump, a valve having a portion thereof subjected to the fluid in said chamber for causing movement of said valve from a first position of venting said device to a second position for establishing communication between said pressure chamber and said device for causing operation of said device, a spring yieldingly opposing said movement of said valve, means under control of said valve for restrictively venting said pressure chamber when said valve is in its said first position, means operative under control of said valve for conducting the pressure fluid from said pressure chamber to said device during said movement of said valve, said valve being moved as aforesaid in response to predetermined pressure of the fluid in said pressure chamber to close said pressure chamber venting means and render the last said pressure fluid conducting means operative to conduct pressure fluid to said device, a pressure relief chamber restrictively communicating with said pressure chamber for receiving fluid therefrom, said valve having a second portion thereof subjected to the fluid trapped in said relief chamber for preventing said movement of said valve, and means operable under control of the vehicle driver for venting said relief chamber to permit said movement of said valve.

14. In a power transmission control mechanism of the character described having a pressure fluid operated device for controlling drive transmission between driving and driven shafts of a motor vehicle, a source of fluid supply, a pump for delivering the fluid under pressure from said supply, means for driving said pump at a speed proportionate to one of said shafts for delivering the fluid under pressure varying with the speed of this shaft, a pressure fluid chamber to which the pressure fluid is delivered from said pump, a pressure fluid relief chamber restrictively communicating with said pressure chamber and adapted to be vented, a valve between said chambers and having opposed portions thereof respectively subjected to the fluid in said chambers, a spring yieldingly acting on said valve, said valve being adapted for movement by the fluid in said pressure chamber from a first position of venting said device to a second position for establishing communication between said pressure chamber and said device for causing operation of said device, said spring preventing said movement of said valve until the fluid in said pressure chamber reaches a predetermined pressure, means under control of said valve for conducting the pressure fluid from said pressure chamber to said device when said valve is moved to its said second position, a passage for the escape of fluid from said pressure chamber, a passage for the escape of fluid from said relief chamber, a second valve adapted for movement from a first position of opening said relief chamber passage and closing said pressure chamber passage to a second position of closing said relief chamber passage and opening said pressure chamber passage, and means under control of the vehicle driver for effecting said movement of said second valve.

15. In a power transmission control mechanism of the character described having a pressure fluid operated device for controlling drive transmission between driving and driven shafts of a motor vehicle, a source of fluid supply, a pump for delivering the fluid under pressure from said supply, means for driving said pump at a speed proportionate to one of said shafts for delivering the fluid under pressure varying with the speed of this shaft, a pressure fluid chamber to which the pressure fluid is delivered from said pump, a pressure fluid relief chamber restrictively communicating with said pressure chamber and adapted to be vented, a valve between said chambers and having opposed portions thereof respectively subjected to the fluid in said chambers, a spring yieldingly acting on said valve, said valve being adapted for movement by the fluid in said pressure chamber from a first position of venting said device to a second position for establishing communication between said pressure chamber and said device for causing operation of said device, said spring preventing said movement of said valve until the fluid in said pressure chamber reaches a predetermined pressure, means under control of said valve for conducting the pressure fluid from said pressure chamber to said device when said valve is moved to its said second position, a passage for the escape of fluid from said relief chamber to accommodate said movement of said valve, and a plurality of independently operable valving means arranged in series with respect to said passage for controlling the escape of fluid therethrough.

16. In a power transmission control mechanism of the character described having a pressure fluid operated device for controlling drive between driving and driven shafts of a motor vehicle which is equipped with an engine throttle adjusting mechanism adapted for manipulation by the vehicle driver, a source of fluid supply, a pump for delivering the fluid under pressure from said supply, means for driving said pump at a speed proportionate to one of said shafts for delivering the fluid under pressure varying with the speed of this shaft, a valve adapted for movement from a first position of venting said device to a second position for establishing communication between the pressure fluid delivered by the pump and said device for causing operation of said device, a spring yieldingly urging said valve to its said first position, means under control of said valve for venting said device to afford release thereof when said valve is in its said first position, means for conducting the pressure fluid from said pump to said valve for causing movement of said valve to its said second position in opposition to said spring when the conducted fluid reaches a predetermined pressure, means under control of said valve for conducting the pressure fluid delivered by said pump to said device when said valve is moved to its said second position, and means operable in response to manipulation of said throttle adjusting mechanism for relieving the pressure of the fluid conducted to said valve to permit said spring to return said valve to its first said position.

17. In a power transmission control mechanism of the character described having a pressure fluid operated device for controlling drive between driving and driven shafts of a motor vehicle which is equipped with an engine throttle adjusting mechanism adapted for manipulation by the vehicle driver, a source of fluid supply, a pump for delivering the fluid under pressure from said supply, means for driving said pump at a speed proportionate to one of said shafts for delivering the fluid under pressure varying with the speed of this shaft, a valve adapted for movement from a first position of venting said device to a second position for establishing communication between the pressure fluid delivered by the pump and said device for causing operation of said device, a spring yieldingly urging said valve to its said first position, means under control of said valve for venting said device to afford release thereof when said valve is in its said first position, means for conducting the pressure fluid from said pump to said valve for causing movement of said valve to its said second position in opposition to said spring when the conducted fluid reaches a predetermined pressure, means under control of said valve for conducting the pressure fluid delivered by said pump to said device when said valve is moved to its said second position, and valving means operable in response to manipulation of said throttle adjusting mechanism for relieving the pressure of the fluid conducted to said valve.

18. In a power transmission control mechanism of the character described having a pressure fluid operated device for controlling drive between driving and driven shafts of a motor vehicle which is equipped with an engine throttle adjusting mechanism adapted for manipulation by the vehicle driver, a source of fluid supply, a pump for delivering the fluid under pressure from said supply, means for driving said pump at a speed proportionate to one of said shafts for delivering the fluid under pressure varying with the speed of this shaft, a valve adapted for movement from a first position of venting said device to a second position for establishing communication between the pressure fluid delivered by the pump and said device for causing operation of said device, a spring yieldingly urging said valve to its said first position, means under control of said valve for venting said device to afford release thereof when said valve is in its said first position, means for conducting the pressure fluid from said pump to said valve for causing movement of said valve to its said second position in opposition to said spring when the conducted fluid reaches a predetermined pressure, means under control of said valve for conducting the pressure fluid delivered by said pump to said device when said valve is moved to its said second position, orifice controlled venting means for the fluid conducted to said valve, and valving means operable in response to manipulation of said throttle adjusting mechanism for controlling the last said venting means.

19. In a power transmission control mechanism of the character described having a pressure fluid operated device for controlling drive between driving and driven shafts of a motor vehicle which is equipped with an engine throttle adjusting mechanism adapted for manipulation by the vehicle driver, a source of fluid supply, a pump for delivering the fluid under pressure from said supply, means for driving said pump at a speed proportionate to one of said shafts for delivering the fluid under pressure varying with the speed of this shaft, a pressure fluid chamber to which the pressure fluid is delivered from said pump, a valve having a portion thereof subjected to the fluid in said chamber for causing movement of said valve from a first position of venting said device to a second position for establishing communication between said pressure chamber and said device for causing operation of said device, a spring yieldingly opposing said movement of said valve, means under control of said valve for restrictively venting said pressure chamber when said valve is in its said first position, means operative under control of said valve for conducting the pressure fluid from said pressure chamber to said device during said movement of said valve, said valve being moved as aforesaid in response to predetermined pressure of the fluid in said pressure chamber to close said pressure chamber venting means and render the last said pressure fluid conducting means operative to conduct pressure fluid to said device, and means operable in response to manipulation of said throttle adjusting mechanism for relieving the pressure of the fluid in said pressure chamber sufficiently to cause said spring to return said valve to its said first position.

20. In a power transmission control mechanism of the character described having a pressure fluid operated device for controlling drive between driving and driven shafts of a motor vehicle which is equipped with an engine throttle adjusting mechanism adapted for manipulation by the vehicle driver, a pressure fluid chamber to which the pressure fluid is delivered from said pump, a pressure fluid relief chamber restrictively communicating with said pressure chamber and adapted to be vented, a valve between said chambers and having opposed portions thereof respectively subjected to the fluid in said chambers, a spring yieldingly acting on said valve, said valve being adapted for movement by the fluid in said pressure chamber from a first position of venting said device to a second position for establishing communication between said pressure chamber and said device for causing operation of said device, said spring preventing said movement of said valve until the fluid in said pressure chamber reaches a predetermined pressure, means under control of said valve for conducting the pressure fluid from said pressure chamber to said device when said valve is moved to its said second position, a passage for the escape of fluid from said pressure chamber, a passage for the escape of fluid from said relief chamber, a second valve adapted for movement from a first position of opening said relief chamber passage and closing said pressure chamber passage to a second position of closing said relief chamber passage and opening said pressure chamber passage, and means for effecting said movement of said second valve in response to manipulation of said throttle adjusting mechanism.

21. In a power transmission control mechanism of the character described having a pressure fluid operated device for controlling drive between driving and driven shafts of a motor vehicle which is equipped with an engine throttle adjusting mechanism adapted for manipulation by the vehicle driver, a source of fluid supply, a pump for delivering the fluid under pressure from said supply, means for driving said pump at a speed proportionate to one of said shafts for delivering the fluid under pressure varying with the speed of this shaft, a pressure fluid chamber to which the pressure fluid is delivered from said pump, a valve having a portion thereof subjected to the fluid in said chamber for causing movement of said valve from a first position of venting said device to a second position for establishing communication between said pressure chamber and said device for causing operation of said device, a spring yieldingly opposing said movement of said valve, means under control of said valve for restrictively venting said pressure chamber when said valve is in its said first position, means operative under control of said valve for conducting the pressure chamber to said device during said movement of said valve, said valve being moved as aforesaid in response to predetermined pressure of the fluid in said pressure chamber to close said pressure chamber venting means and render the last said pressure conducting means operative to conduct pressure fluid to said device, a pressure relief chamber restrictively communicating with said pressure chamber for receiving fluid therefrom, said valve having a second portion thereof subjected to the fluid trapped in said relief chamber for preventing said movement of said valve, and means operable in response to manipulation of said throttle adjusting mechanism for selectively venting said relief chamber to permit said movement of said valve or venting said pressure chamber to cause said spring to return said valve to its said first position.

22. In a power transmission control mechanism of the character described having a pressure fluid operated device for controlling drive between driving and driven shafts of a motor vehicle which is equipped with an engine throttle adjusting mechanism adapted for manipulation by the vehicle driver, a pressure fluid chamber to which the pressure fluid is delivered from said pump, a pressure fluid relief chamber adapted to be vented, a valve between said chambers and having opposed portions thereof respectively subjected to the fluid in said chambers, a spring yieldingly acting on said valve, said valve being adapted for movement by the fluid in said pressure chamber from a first position of venting said device to a second position for establishing communication between said pressure chamber and said device for causing operation of said device, said spring preventing said movement of said valve until the fluid in said pressure chamber reaches a predetermined pressure, means under control of said valve for conducting the pressure fluid from said pressure chamber to said device when said valve is moved to its said second position, a passage for the escape of fluid from said relief chamber to accommodate said movement of said valve, valving means adapted for operation in response to manipulation of said throttle adjusting mechanism for controlling the escape of fluid through said passage from said relief chamber, and second valving means adapted for operation at the will of the vehicle driver independently of the operation of said throttle adjusting mechanism for controlling the escape of fluid through said passage from the second said valving means to the delivery end of said passage.

23. In a power transmission control mechanism of the character described having a pressure fluid operated device for controlling drive between driving and driven shafts of a motor vehicle which is equipped with an engine throttle valve and a throttle valve actuator movable through a throttle valve adjusting range and therebeyond to overtravel the throttle valve, a control valve, means for subjecting said control valve to a fluid under pressure proportionate to the speed of travel of the vehicle, said control valve being adapted for movement in response to predetermined pressure of the fluid acting thereon from a position of venting said device to a second position for delivering the pressure fluid to said device to effect operation thereof, means operable in response to said overtravelling movement of said throttle valve actuator for venting the pressure fluid acting on said valve, and means for restoring said valve to its said venting position.

24. In a power transmission control mechanism of the character described having a pressure fluid operated device for controlling drive between driving and driven shafts of a motor vehicle which is equipped with an engine throttle valve and a throttle valve actuator movable through a throttle valve adjusting range and therebeyond to overtravel the throttle valve, a control valve, means for subjecting said control valve to a fluid under pressure proportionate to the speed of travel of the vehicle, said control valve being adapted for movement in response to predetermined pressure of the fluid acting thereon from a position of venting said device to a second position for delivering the pressure fluid to said device to effect operation thereof, orifice controlled venting means for the fluid to which said control valve is subjected as aforesaid, and valving means operable in response to said overtravelling movement of said throttle valve actuator for controlling said orifice venting means.

25. In a power transmission control mechanism of the character described having a pressure fluid operated device for controlling drive between driving and driven shafts of a motor vehicle which is equipped with an engine throttle valve and a throttle valve actuator movable through a throttle valve adjusting range and therebeyond to overtravel the throttle valve, a control valve, means for subjecting said control valve to a fluid under pressure proportionate to the speed of travel of the vehicle, said control valve being adapted for movement in response to predetermined pressure of the fluid acting thereon from a position of venting said device to a second position for delivering the pressure fluid to said device to effect operation thereof, a pressure relief chamber restrictively communicating with said pressure fluid, said control valve having a second portion thereof subjected to the fluid trapped in said relief chamber for preventing said movement of said valve, and valving means operable in response to said overtravelling movement of said throttle valve actuator for venting the pressure fluid acting on said valve, said valving means acting to vent said relief chamber in response to manipulation of said throttle valve actuator to approximately its throttle closing position.

26. In a power transmission for a motor vehicle having an engine provided with a throttle valve actuator operable under control of the vehicle driver throughout a primary range of movement in adjusting the throttle valve between its fully opened and closed positions; means accommodating operation of said throttle valve actuator, under control of the vehicle driver, in throttle opening direction throughout its said primary range of movement and therebeyond in a secondary range of movement; a driving shaft adapted to receive drive from the engine; a driven shaft adapted to drive the vehicle; transmission means operable to drivingly connect said shafts for providing relatively slow and fast speed drives from the driving shaft to the driven shaft; kickdown control means operable in response to operation of said throttle valve actuator in its said secondary range, when the vehicle is being driven in said fast drive, for effecting step-down change in said transmission means from said fast drive to said slow drive; governor control means operating as a function of the speed of one of said shafts, when the vehicle is being driven in said fast speed and when the speed of said one shaft is above a predetermined value, for rendering said kickdown control means inoperative to effect said step-down change; said kickdown control means being so constructed and arranged as to effect step-up change in said transmission means from said slow drive to said fast drive, subsequently to operation of said kickdown control means as aforesaid and when the vehicle is travelling at a speed approximately equal to its speed during which said step-down change was effected, but not until said throttle valve actuator has been operated in throttle closing direction to approximately its closed throttle valve position.

27. In a power transmission for a motor vehicle having an engine provided with a throttle valve actuator operable under control of the vehicle driver throughout a primary range of movement in adjusting the throttle valve between its fully opened and closed positions; means accommodating operation of said throttle valve actuator, under control of the vehicle driver, in throttle opening direction throughout its said primary range of movement and therebeyond in a secondary range of movement; a driving shaft adapted to receive drive from the engine; a driven shaft adapted to drive the vehicle; transmission means operable to drivingly connect said shafts for providing relatively slow and fast speed drives from the driving shaft to the driven shaft; kickdown control means operable in response to operation of said throttle valve actuator in its said secondary range, when the vehicle is being driven in said fast drive, for effecting step-down change in said transmission means from said fast drive to said slow drive; governor control means operating as a function of the speed of one of said shafts, when the vehicle is being driven in said fast speed and when the speed of said one shaft is above a predetermined value, for rendering said kickdown control means inoperative to effect said stepdown change; said kickdown control means being so constructed and arranged as to effect step-up change in said transmission means from said slow drive to said fast drive, subsequently to operation of said kickdown control means as aforesaid and when the vehicle is travelling at a speed approximately equal to its speed during which said step-down change was effected, but not until said throttle valve actuator has been operated in throttle closing direction from its said secondary range to a position thereof within its said primary range.

28. In a power transmission for a motor vehicle having an engine provided with a throttle-valve-controlling accelerator pedal biased to fully released position and operable by the vehicle driver from said fully released position, corresponding to closed throttle, to a fully depressed position in the direction of throttle opening; a driving shaft adapted to receive drive from the engine; a driven shaft adapted to drive the vehicle; transmission means operable to drivingly connect said shafts for providing relatively slow and fast speed drives from the driving shaft to the driven shaft; kickdown control means operable in response to said full depression of said pedal, when the vehicle is being driven in said fast drive, for effecting step-down change in said transmission means from said fast drive to said slow drive; governor control means operating as a function of the speed of one of said shafts, when the vehicle is being driven in said fast speed and when the speed of said one shaft is above a predetermined value, for rendering said kickdown control means inoperative to effect said stepdown change; said kickdown control means being so constructed and arranged as to effect step-up change in said transmission means from said slow drive to said fast drive, subsequently to operation of said kickdown control means as aforesaid and when the vehicle is travelling at a speed approximately equal to its speed during which said step-down change was effected, but not until said pedal has moved in its direction of throttle closing to approximately its fully released position.

29. In a power transmission for a motor vehicle having an engine provided with a throttle-valve-controlling accelerator pedal biased to fully released position and operable by the vehicle driver from said fully released position, corresponding to closed throttle, to a fully depressed position in the direction of throttle opening; a driving shaft adapted to receive drive from the engine; a driven shaft adapted to drive the vehicle; transmission means operable to drivingly connect said shafts for providing relatively slow and fast speed drives from the driving shaft to the driven shaft; kickdown control means operable in response to said full depression of said pedal, when the vehicle is being driven in said fast drive, for effecting step-down change in said transmission means from said fast drive to said slow drive; governor control means operating as a function of the speed of one of said shafts, when the vehicle is being driven in said fast speed and when the speed of said one shaft is above a predetermined value, for rendering said kickdown control means inoperative to effect said step-down change; said kickdown control means being so constructed and arranged as to effect step-up change in said transmission means from said slow drive to said fast drive, subsequently to operation of said kickdown control means as aforesaid and when the vehicle is travelling at a speed approximately equal to its speed during which said step-down change was effected, but not until said pedal has moved in its direction of throttle closing to a position materially closer to its said fully released position than the position thereof at which said kickdown control means functions to effect said step-down change as aforesaid.

GORDON R. PENNINGTON.